United States Patent
Das

(10) Patent No.: US 8,145,549 B2
(45) Date of Patent: Mar. 27, 2012

(54) SYSTEM AND METHOD FOR OFFERING RISK-BASED INTEREST RATES IN A CREDIT INSTUTMENT

(75) Inventor: Jayanta Das, Broomall, PA (US)

(73) Assignee: JPMorgan Chase Bank, N.A., New York, NY (US)

(*) Notice: Subject to any disclaimer, the term of this patent is extended or adjusted under 35 U.S.C. 154(b) by 0 days.

(21) Appl. No.: 12/882,651

(22) Filed: Sep. 15, 2010

(65) Prior Publication Data

US 2011/0004545 A1    Jan. 6, 2011

Related U.S. Application Data

(62) Division of application No. 10/448,230, filed on May 30, 2003.

(51) Int. Cl.
*G06Q 40/00* (2006.01)

(52) U.S. Cl. ............. 705/35; 705/36 R; 705/37; 705/38; 705/39; 705/40; 705/41; 705/42

(58) Field of Classification Search ............... 705/35–42
See application file for complete search history.

(56) References Cited

U.S. PATENT DOCUMENTS

| | | |
|---|---|---|
| 3,230,650 A | 1/1966 | Orkin |
| 3,634,669 A | 1/1972 | Soumas et al. |
| 3,713,235 A | 1/1973 | Roberts |
| 3,855,033 A | 12/1974 | Staats |
| 3,938,090 A | 2/1976 | Borison et al. |
| 3,946,206 A | 3/1976 | Darjany |
| 4,022,943 A | 5/1977 | Erb et al. |
| 4,047,033 A | 9/1977 | Malmberg et al. |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,205,780 A | 6/1980 | Burns et al. |
| 4,223,403 A | 9/1980 | Konheim et al. |

(Continued)

FOREIGN PATENT DOCUMENTS

CA    2293321    12/1998

(Continued)

OTHER PUBLICATIONS

"In Time of Need: A National Strategy for Disaster Relief Cards," prepared by JPMorgan Chase Treasury Services—Public Sector, Jan. 26, 2007.

(Continued)

*Primary Examiner* — Daniel Felten
(74) *Attorney, Agent, or Firm* — Hunton & Williams LLP

(57) ABSTRACT

A system and method for communicating an offer to apply for a credit instrument is provided. A processing allows for processing credit history data. A calculating step allows for calculating a first plurality of interest rates based on the credit history data. A determining step allows for determining a second plurality of interest rates based on the first plurality of interest rates, wherein the second plurality of interest rates corresponds to a plurality of credit risk scores. Finally, a communicating step allows for communicating the offer to apply for a credit instrument in an initial communication with an offeree, the offer disclosing the second plurality of interest rates. An apparatus that calculates the interest rates used in the offer is also provided.

4 Claims, 5 Drawing Sheets

U.S. PATENT DOCUMENTS

| | | | |
|---|---|---|---|
| D259,048 S | 4/1981 | Peterson |
| 4,264,808 A | 4/1981 | Owens et al. |
| 4,319,336 A | 3/1982 | Andersen et al. |
| 4,338,587 A | 7/1982 | Chiappetti |
| 4,380,699 A | 4/1983 | Monnier et al. |
| 4,453,074 A | 6/1984 | Weinstein |
| 4,454,414 A | 6/1984 | Benton |
| 4,465,206 A | 8/1984 | Sorel et al. |
| 4,479,995 A | 10/1984 | Suzuki et al. |
| 4,545,838 A | 10/1985 | Minkus et al. |
| 4,575,127 A | 3/1986 | Michel |
| 4,575,621 A | 3/1986 | Dreifus |
| 4,582,985 A | 4/1986 | Lofberg |
| 4,605,820 A | 8/1986 | Campbell, Jr. |
| 4,605,844 A | 8/1986 | Haggan |
| 4,614,861 A | 9/1986 | Pavlov et al. |
| 4,634,845 A | 1/1987 | Riley |
| 4,641,239 A | 2/1987 | Takesako |
| 4,643,452 A | 2/1987 | Chang et al. |
| 4,645,701 A | 2/1987 | Zarrow |
| 4,647,714 A | 3/1987 | Goto |
| 4,648,189 A | 3/1987 | Michel |
| 4,650,981 A | 3/1987 | Foletta |
| 4,661,658 A | 4/1987 | Matyas |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,707,594 A | 11/1987 | Roth |
| 4,713,760 A | 12/1987 | Yamada et al. |
| 4,723,212 A | 2/1988 | O'Brien |
| 4,736,094 A | 4/1988 | Yoshida |
| 4,746,787 A | 5/1988 | Suto et al. |
| 4,747,620 A | 5/1988 | Kay et al. |
| 4,750,119 A | 6/1988 | Robertson |
| 4,752,676 A | 6/1988 | Leonard et al. |
| 4,754,418 A | 6/1988 | Hara |
| 4,755,661 A | 7/1988 | Ruebsam |
| 4,766,293 A | 8/1988 | Boston |
| 4,766,539 A | 8/1988 | Fox |
| 4,777,563 A | 10/1988 | Teraoka et al. |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,839,504 A | 6/1989 | Nakano |
| 4,845,347 A | 7/1989 | McCrindle |
| 4,851,650 A | 7/1989 | Kitade |
| 4,856,857 A | 8/1989 | Takeuchi et al. |
| 4,859,837 A | 8/1989 | Halpern |
| 4,866,545 A | 9/1989 | LaManna et al. |
| 4,868,376 A | 9/1989 | Lessin et al. |
| 4,870,259 A | 9/1989 | Boggan et al. |
| 4,877,847 A | 10/1989 | Masu et al. |
| 4,891,503 A | 1/1990 | Jewell |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,931,623 A | 6/1990 | Nakamura et al. |
| 4,938,830 A | 7/1990 | Cannistra |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| D310,386 S | 9/1990 | Michels et al. |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,986,868 A | 1/1991 | Schmidt |
| 5,023,782 A | 6/1991 | Lutz et al. |
| 5,025,139 A | 6/1991 | Halliburton, Jr. |
| 5,049,728 A | 9/1991 | Rovin |
| 5,054,096 A | 10/1991 | Beizer |
| 5,055,662 A | 10/1991 | Hasegawa |
| 5,056,019 A | 10/1991 | Schultz et al. |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,122,950 A | 6/1992 | Mee |
| 5,140,517 A | 8/1992 | Nagata et al. |
| 5,146,068 A | 9/1992 | Ugawa et al. |
| 5,163,098 A | 11/1992 | Dahbura |
| 5,173,851 A | 12/1992 | Off et al. |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,231,569 A | 7/1993 | Myatt et al. |
| 5,237,620 A | 8/1993 | Deaton |
| 5,239,462 A | 8/1993 | Jones |
| 5,247,190 A | 9/1993 | Friend et al. |
| 5,257,486 A | 11/1993 | Holmwall |
| 5,265,008 A | 11/1993 | Benton et al. |
| 5,276,311 A | 1/1994 | Hennige |
| 5,287,268 A | 2/1994 | McCarthy |
| 5,287,269 A | 2/1994 | Dorrough et al. |
| 5,297,026 A | 3/1994 | Hoffman |
| 5,305,196 A | 4/1994 | Deaton et al. |
| 5,311,594 A | 5/1994 | Penzias |
| 5,326,959 A | 7/1994 | Perazza |
| 5,326,960 A | 7/1994 | Tannenbaum |
| 5,327,508 A | 7/1994 | Deaton et al. |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,380,046 A | 1/1995 | Stephens |
| 5,382,784 A | 1/1995 | Eberhardt |
| 5,383,113 A | 1/1995 | Knight |
| 5,383,687 A | 1/1995 | Suess et al. |
| 5,388,165 A | 2/1995 | Gabriel |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,409,092 A | 4/1995 | Itako et al. |
| 5,412,190 A | 5/1995 | Kopesec |
| 5,412,192 A | 5/1995 | Hoss |
| 5,413,341 A | 5/1995 | Lieberman |
| 5,424,524 A | 6/1995 | Ruppert et al. |
| 5,428,684 A | 6/1995 | Akiyama et al. |
| 5,430,644 A | 7/1995 | Deaton et al. |
| 5,432,326 A | 7/1995 | Noblett et al. |
| 5,440,108 A | 8/1995 | Tran et al. |
| 5,444,794 A | 8/1995 | Uhland |
| 5,448,471 A | 9/1995 | Deaton et al. |
| 5,450,477 A | 9/1995 | Amarant et al. |
| 5,450,491 A | 9/1995 | McNair |

| | | |
|---|---|---|
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt et al. |
| 5,466,919 A | 11/1995 | Hovakimian |
| 5,466,920 A | 11/1995 | Nair et al. |
| 5,477,038 A | 12/1995 | Levine et al. |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Heintzeman et al. |
| 5,483,445 A | 1/1996 | Pickering |
| 5,489,123 A | 2/1996 | Roshkoff |
| 5,495,981 A | 3/1996 | Warther |
| 5,500,514 A | 3/1996 | Veeneman et al. |
| 5,500,890 A | 3/1996 | Rogge et al. |
| 5,503,891 A | 4/1996 | Marshall et al. |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik et al. |
| 5,532,689 A | 7/1996 | Bueno |
| 5,539,825 A | 7/1996 | Akiyama et al. |
| 5,541,583 A | 7/1996 | Mandelbaum |
| 5,544,246 A | 8/1996 | Mandelbaum et al. |
| 5,546,446 A | 8/1996 | Tsunokawa et al. |
| 5,553,120 A | 9/1996 | Katz |
| 5,557,092 A | 9/1996 | Ackley et al. |
| 5,557,516 A | 9/1996 | Hogan |
| 5,563,934 A | 10/1996 | Eda |
| 5,572,004 A | 11/1996 | Raimann |
| 5,577,109 A | 11/1996 | Stimson et al. |
| 5,581,064 A | 12/1996 | Riley et al. |
| 5,583,933 A | 12/1996 | Mark |
| 5,585,787 A | 12/1996 | Wallerstein |
| 5,590,038 A | 12/1996 | Pitroda |
| 5,604,542 A | 2/1997 | Dedrick |
| 5,608,785 A | 3/1997 | Kasday |
| 5,609,253 A | 3/1997 | Goade, Sr. |
| 5,612,868 A | 3/1997 | Off et al. |
| 5,617,474 A | 4/1997 | Ditzig et al. |
| 5,619,558 A | 4/1997 | Jheeta |
| 5,621,787 A | 4/1997 | McKoy et al. |
| 5,637,845 A | 6/1997 | Kolls |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,650,604 A | 7/1997 | Marcous et al. |
| 5,652,786 A | 7/1997 | Rogers |
| 5,659,469 A | 8/1997 | Deaton et al. |
| 5,659,741 A | 8/1997 | Eberhardt |
| 5,664,110 A | 9/1997 | Green et al. |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio et al. |
| 5,677,521 A | 10/1997 | Garrou |
| 5,677,955 A | 10/1997 | Doggett et al. |
| 5,680,459 A | 10/1997 | Hook et al. |
| 5,684,291 A | 11/1997 | Taskett |
| 5,687,322 A | 11/1997 | Deaton et al. |
| 5,689,100 A | 11/1997 | Carrithers et al. |
| 5,689,650 A | 11/1997 | McClelland et al. |
| 5,692,132 A | 11/1997 | Hogan |
| 5,696,907 A | 12/1997 | Tom |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,704,046 A | 12/1997 | Hogan |
| 5,705,798 A | 1/1998 | Tarbox |
| 5,708,422 A | 1/1998 | Blonder et al. |
| 5,710,458 A | 1/1998 | Iwasaki |
| 5,710,886 A | 1/1998 | Christensen et al. |
| 5,715,298 A | 2/1998 | Rogers |
| 5,715,399 A | 2/1998 | Bezos |
| 5,717,925 A | 2/1998 | Harper et al. |
| 5,721,768 A | 2/1998 | Stimson et al. |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,732,136 A | 3/1998 | Murphree et al. |
| 5,734,154 A | 3/1998 | Jachimowicz et al. |
| 5,736,728 A | 4/1998 | Matsubara |
| 5,737,421 A | 4/1998 | Audebert |
| 5,740,549 A | 4/1998 | Reilly et al. |
| 5,744,787 A | 4/1998 | Teicher |
| 5,745,049 A | 4/1998 | Akiyama et al. |
| 5,745,555 A | 4/1998 | Mark |
| 5,745,706 A | 4/1998 | Wolfberg et al. |
| 5,748,737 A | 5/1998 | Daggar |
| 5,749,075 A | 5/1998 | Toader et al. |
| 5,760,381 A | 6/1998 | Stich et al. |
| 5,765,138 A | 6/1998 | Aycock et al. |
| 5,765,141 A | 6/1998 | Spector |
| 5,770,843 A | 6/1998 | Rose et al. |
| 5,770,849 A | 6/1998 | Novis et al. |
| 5,774,882 A | 6/1998 | Keen |
| 5,777,305 A | 7/1998 | Smith et al. |
| 5,777,306 A | 7/1998 | Masuda |
| 5,777,903 A | 7/1998 | Piosenka et al. |
| 5,778,067 A | 7/1998 | Jones et al. |
| 5,787,156 A | 7/1998 | Katz |
| 5,787,403 A | 7/1998 | Randle |
| 5,787,404 A | 7/1998 | Fernandez-Holmann |
| 5,789,732 A | 8/1998 | McMahon et al. |
| 5,789,733 A | 8/1998 | Jachimowicz et al. |
| 5,790,636 A | 8/1998 | Marshall |
| 5,794,207 A | 8/1998 | Walker |
| 5,796,827 A | 8/1998 | Coppersmith et al. |
| 5,797,133 A | 8/1998 | Jones |
| 5,798,950 A | 8/1998 | Fitzgerald |
| 5,799,087 A | 8/1998 | Rosen |
| 5,802,176 A | 9/1998 | Audebert |
| 5,805,719 A | 9/1998 | Pare et al. |
| 5,806,042 A | 9/1998 | Kelly et al. |
| 5,806,044 A | 9/1998 | Powell |
| 5,806,045 A | 9/1998 | Biorge |
| 5,806,047 A | 9/1998 | Hackel et al. |
| 5,807,627 A | 9/1998 | Friend et al. |
| 5,809,478 A | 9/1998 | Greco |
| 5,814,796 A | 9/1998 | Benson et al. |
| 5,815,658 A | 9/1998 | Kuriyama |
| 5,819,234 A | 10/1998 | Slavin et al. |
| 5,819,237 A | 10/1998 | Garman |
| 5,825,871 A | 10/1998 | Mark |
| 5,826,243 A | 10/1998 | Musmanno et al. |
| 5,832,090 A | 11/1998 | Raspotnik |
| 5,832,457 A | 11/1998 | O'Brien |
| 5,832,488 A | 11/1998 | Eberhardt |
| 5,835,061 A | 11/1998 | Stewart |
| 5,835,576 A | 11/1998 | Katz |
| 5,839,113 A | 11/1998 | Federau et al. |
| 5,842,421 A | 12/1998 | Desilets et al. |
| 5,852,811 A | 12/1998 | Atkins |
| 5,852,812 A | 12/1998 | Reeder |
| 5,857,079 A | 1/1999 | Claus et al. |
| 5,857,175 A | 1/1999 | Day |
| 5,857,709 A | 1/1999 | Chock |
| 5,859,419 A | 1/1999 | Wynn |
| 5,864,609 A | 1/1999 | Cross et al. |
| 5,864,828 A | 1/1999 | Atkins |
| 5,864,830 A | 1/1999 | Armetta et al. |
| RE36,116 E | 2/1999 | McCarthy |
| 5,870,718 A | 2/1999 | Spector |
| 5,870,721 A | 2/1999 | Norris |
| 5,875,437 A | 2/1999 | Atkins |
| 5,877,975 A | 3/1999 | Jigour et al. |
| 5,883,377 A | 3/1999 | Chapin, Jr. |

| | | | | | | |
|---|---|---|---|---|---|---|
| 5,883,810 | A | 3/1999 | Franklin et al. | 6,029,144 | A | 2/2000 | Barrett et al. |
| 5,884,271 | A | 3/1999 | Pitroda | 6,029,153 | A | 2/2000 | Bauchner et al. |
| 5,884,278 | A | 3/1999 | Powell | 6,029,890 | A | 2/2000 | Austin |
| 5,884,285 | A | 3/1999 | Atkins | 6,032,859 | A | 3/2000 | Muehlberger et al. |
| 5,887,065 | A | 3/1999 | Audebert | 6,036,099 | A | 3/2000 | Leighton |
| 5,890,138 | A | 3/1999 | Godin et al. | 6,038,292 | A | 3/2000 | Thomas |
| 5,890,140 | A | 3/1999 | Clark et al. | 6,038,552 | A | 3/2000 | Fleischl et al. |
| H1794 | H | 4/1999 | Claus | 6,041,315 | A | 3/2000 | Pollin |
| D408,054 | S | 4/1999 | Leedy, Jr. | 6,044,360 | A | 3/2000 | Picciallo |
| 5,897,620 | A | 4/1999 | Walker et al. | 6,045,042 | A | 4/2000 | Ohno |
| 5,897,621 | A | 4/1999 | Boesch et al. | 6,045,050 | A | 4/2000 | Ippolito et al. |
| 5,901,303 | A | 5/1999 | Chew | 6,047,067 | A | 4/2000 | Rosen |
| 5,903,879 | A | 5/1999 | Mitchell | 6,047,268 | A | 4/2000 | Bartoli et al. |
| 5,905,246 | A | 5/1999 | Fajkowski | 6,048,271 | A | 4/2000 | Barcelou |
| 5,907,142 | A | 5/1999 | Kelsey | 6,049,463 | A | 4/2000 | O'Malley et al. |
| 5,907,350 | A | 5/1999 | Nemirofsky | 6,049,773 | A | 4/2000 | McCormack et al. |
| 5,907,831 | A | 5/1999 | Lotvin et al. | 6,049,782 | A | 4/2000 | Gottesman et al. |
| 5,911,135 | A | 6/1999 | Atkins | 6,055,573 | A | 4/2000 | Gardenswartz et al. |
| 5,911,136 | A | 6/1999 | Atkins | 6,058,378 | A | 5/2000 | Clark et al. |
| 5,918,211 | A | 6/1999 | Sloane | 6,061,660 | A | 5/2000 | Eggleston et al. |
| 5,920,629 | A | 7/1999 | Rosen | 6,064,985 | A | 5/2000 | Anderson |
| 5,920,844 | A | 7/1999 | Hotta et al. | 6,065,675 | A | 5/2000 | Teicher |
| 5,920,847 | A | 7/1999 | Kolling et al. | 6,068,183 | A | 5/2000 | Freeman et al. |
| 5,923,734 | A | 7/1999 | Taskett | 6,070,067 | A | 5/2000 | Nguyen et al. |
| 5,926,792 | A | 7/1999 | Koppes et al. | 6,070,147 | A | 5/2000 | Harms et al. |
| 5,926,800 | A | 7/1999 | Baronowski et al. | 6,070,153 | A | 5/2000 | Simpson |
| 5,928,082 | A | 7/1999 | Clapper, Jr. | D427,167 | S | 6/2000 | Iwasaki |
| 5,931,764 | A | 8/1999 | Freeman et al. | 6,076,068 | A | 6/2000 | DeLapa et al. |
| 5,933,812 | A | 8/1999 | Meyer et al. | 6,076,072 | A | 6/2000 | Libman |
| 5,933,817 | A | 8/1999 | Hucal | 6,078,888 | A | 6/2000 | Johnson, Jr. |
| 5,936,221 | A | 8/1999 | Corder et al. | 6,078,891 | A | 6/2000 | Riordan et al. |
| 5,937,068 | A | 8/1999 | Audebert | 6,085,976 | A | 7/2000 | Scher |
| 5,946,669 | A | 8/1999 | Polk | 6,089,284 | A | 7/2000 | Kaehler et al. |
| 5,949,044 | A | 9/1999 | Walker et al. | 6,091,817 | A | 7/2000 | Bertina et al. |
| 5,953,423 | A | 9/1999 | Rosen | 6,092,056 | A | 7/2000 | Tull, Jr. et al. |
| 5,955,961 | A | 9/1999 | Wallerstein | 6,092,057 | A | 7/2000 | Zimmermann et al. |
| 5,956,695 | A | 9/1999 | Carrithers et al. | 6,095,412 | A | 8/2000 | Bertina et al. |
| 5,956,711 | A | 9/1999 | Sullivan et al. | 6,095,416 | A | 8/2000 | Grant et al. |
| 5,963,648 | A | 10/1999 | Rosen | 6,098,053 | A | 8/2000 | Slater |
| 5,963,925 | A | 10/1999 | Kolling et al. | 6,105,006 | A | 8/2000 | Davis et al. |
| 5,970,469 | A | 10/1999 | Scroggie et al. | 6,105,007 | A | 8/2000 | Norris |
| 5,970,479 | A | 10/1999 | Shepherd | 6,105,008 | A | 8/2000 | Davis et al. |
| 5,970,480 | A | 10/1999 | Kalina | 6,105,009 | A | 8/2000 | Cuervo |
| 5,974,399 | A | 10/1999 | Giuliani et al. | 6,105,011 | A | 8/2000 | Morrison, Jr. |
| RE36,365 | E | 11/1999 | Levine et al. | 6,105,865 | A | 8/2000 | Hardesty |
| 5,979,757 | A | 11/1999 | Tracy | 6,108,642 | A | 8/2000 | Findley |
| 5,984,180 | A | 11/1999 | Albrecht | 6,109,525 | A | 8/2000 | Blomqvist et al. |
| 5,984,191 | A | 11/1999 | Chapin, Jr. | 6,112,190 | A | 8/2000 | Fletcher et al. |
| 5,987,434 | A | 11/1999 | Libman | 6,112,191 | A | 8/2000 | Burke |
| 5,988,509 | A | 11/1999 | Taskett | 6,115,458 | A | 9/2000 | Taskett |
| 5,991,413 | A | 11/1999 | Arditti et al. | 6,119,097 | A | 9/2000 | Ibarra |
| 5,991,736 | A | 11/1999 | Ferguson et al. | 6,119,103 | A | 9/2000 | Basch et al. |
| 5,991,743 | A | 11/1999 | Irving et al. | 6,119,107 | A | 9/2000 | Polk |
| 5,991,748 | A | 11/1999 | Taskett | 6,119,932 | A | 9/2000 | Maloney et al. |
| 5,991,750 | A | 11/1999 | Watson | 6,119,933 | A | 9/2000 | Wong et al. |
| 5,999,596 | A | 12/1999 | Walker et al. | 6,122,623 | A | 9/2000 | Garman |
| 5,999,624 | A | 12/1999 | Hopkins | 6,128,598 | A | 10/2000 | Walker et al. |
| 5,999,917 | A | 12/1999 | Facciani et al. | 6,128,599 | A | 10/2000 | Walker et al. |
| 6,000,608 | A | 12/1999 | Dorf | 6,129,274 | A | 10/2000 | Suzuki |
| 6,000,832 | A | 12/1999 | Franklin et al. | 6,129,572 | A | 10/2000 | Feldman et al. |
| 6,002,383 | A | 12/1999 | Shimada | 6,134,309 | A | 10/2000 | Carson |
| 6,003,762 | A | 12/1999 | Hayashida | 6,134,536 | A | 10/2000 | Shepherd |
| 6,004,681 | A | 12/1999 | Epstein et al. | 6,138,911 | A | 10/2000 | Fredregill et al. |
| 6,006,205 | A | 12/1999 | Loeb et al. | 6,138,917 | A | 10/2000 | Chapin, Jr. |
| 6,006,988 | A | 12/1999 | Behrmann et al. | 6,141,666 | A | 10/2000 | Tobin |
| 6,009,411 | A | 12/1999 | Kepecs | 6,142,640 | A | 11/2000 | Schofield |
| 6,009,415 | A | 12/1999 | Shurling et al. | 6,144,848 | A | 11/2000 | Walsh et al. |
| 6,012,049 | A | 1/2000 | Kawan | 6,145,741 | A | 11/2000 | Wisdom et al. |
| 6,014,634 | A | 1/2000 | Scroggie et al. | 6,148,293 | A | 11/2000 | King |
| 6,014,645 | A | 1/2000 | Cunningham | 6,148,297 | A | 11/2000 | Swor et al. |
| 6,014,749 | A | 1/2000 | Gloor et al. | 6,161,096 | A | 12/2000 | Bell |
| 6,016,482 | A | 1/2000 | Molinari et al. | 6,163,770 | A | 12/2000 | Gamble et al. |
| 6,016,954 | A | 1/2000 | Abe et al. | 6,163,771 | A | 12/2000 | Walker et al. |
| 6,019,284 | A | 2/2000 | Freeman et al. | 6,164,533 | A | 12/2000 | Barton |
| 6,021,189 | A | 2/2000 | Vu | 6,164,548 | A | 12/2000 | Curiel |
| 6,024,286 | A | 2/2000 | Bradley et al. | 6,167,385 | A | 12/2000 | Hartley-Urquhart |
| 6,025,283 | A | 2/2000 | Roberts | 6,169,974 | B1 | 1/2001 | Baumgartner et al. |
| 6,026,370 | A | 2/2000 | Jermyn | 6,169,975 | B1 | 1/2001 | White et al. |
| 6,029,139 | A | 2/2000 | Cunningham et al. | 6,173,267 | B1 | 1/2001 | Cairns |

| Patent | Date | Name |
|---|---|---|
| 6,178,408 B1 | 1/2001 | Copple et al. |
| 6,179,211 B1 | 1/2001 | Green et al. |
| 6,182,048 B1 | 1/2001 | Osborn et al. |
| 6,182,059 B1 | 1/2001 | Angotti et al. |
| D437,882 S | 2/2001 | Creighton |
| 6,182,894 B1 | 2/2001 | Hackett et al. |
| 6,185,541 B1 | 2/2001 | Scroggie et al. |
| 6,186,793 B1 | 2/2001 | Brubaker |
| 6,188,309 B1 | 2/2001 | Levine |
| 6,189,787 B1 | 2/2001 | Dorf |
| 6,192,113 B1 | 2/2001 | Lorsch |
| 6,192,142 B1 | 2/2001 | Pare, Jr. et al. |
| 6,195,644 B1 | 2/2001 | Bowie |
| 6,202,053 B1 | 3/2001 | Christiansen et al. |
| RE37,122 E | 4/2001 | Levine et al. |
| 6,213,392 B1 | 4/2001 | Zuppichich |
| 6,222,914 B1 | 4/2001 | McMullin |
| 6,223,143 B1 | 4/2001 | Weinstock et al. |
| D442,627 S | 5/2001 | Webb et al. |
| 6,227,445 B1 | 5/2001 | Brookner |
| 6,227,447 B1 | 5/2001 | Campisano |
| 6,227,972 B1 | 5/2001 | Walker et al. |
| 6,243,688 B1 | 6/2001 | Kalina |
| 6,243,689 B1 | 6/2001 | Norton |
| 6,260,758 B1 | 7/2001 | Blumberg |
| 6,263,316 B1 | 7/2001 | Khan et al. |
| 6,265,977 B1 | 7/2001 | Vega et al. |
| 6,267,292 B1 | 7/2001 | Walker et al. |
| 6,278,981 B1 | 8/2001 | Dembo et al. |
| 6,278,996 B1 | 8/2001 | Richardson et al. |
| 6,282,516 B1 | 8/2001 | Giullani |
| 6,282,522 B1 | 8/2001 | Davis et al. |
| 6,289,322 B1 | 9/2001 | Kitchen et al. |
| 6,289,324 B1 | 9/2001 | Kawan |
| 6,292,786 B1 | 9/2001 | Deaton et al. |
| 6,295,344 B1 | 9/2001 | Marshall |
| 6,295,522 B1 | 9/2001 | Boesch |
| D449,336 S | 10/2001 | Webb et al. |
| 6,298,336 B1 | 10/2001 | Davis et al. |
| 6,302,444 B1 | 10/2001 | Cobben |
| 6,308,268 B1 | 10/2001 | Audebert |
| 6,308,887 B1 | 10/2001 | Korman et al. |
| 6,315,193 B1 | 11/2001 | Hogan |
| 6,315,195 B1 | 11/2001 | Ramachandran |
| 6,315,196 B1 | 11/2001 | Bachman |
| 6,321,211 B1 | 11/2001 | Dodd |
| 6,324,524 B1 * | 11/2001 | Lent et al. ............ 705/38 |
| 6,324,526 B1 | 11/2001 | Dagostino |
| 6,327,573 B1 | 12/2001 | Walker et al. |
| 6,327,575 B1 | 12/2001 | Katz |
| 6,330,543 B1 | 12/2001 | Kepecs |
| 6,330,546 B1 | 12/2001 | Gopinathan et al. |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,338,048 B1 | 1/2002 | Mori |
| 6,341,724 B2 | 1/2002 | Campisano |
| 6,343,743 B1 | 2/2002 | Lamla |
| 6,344,108 B1 | 2/2002 | Von Medvey et al. |
| 6,345,261 B1 | 2/2002 | Feidelson |
| 6,345,766 B1 | 2/2002 | Taskett et al. |
| 6,349,290 B1 | 2/2002 | Horowitz et al. |
| 6,349,291 B1 | 2/2002 | Varma |
| 6,349,972 B1 | 2/2002 | Geiger et al. |
| 6,351,735 B1 | 2/2002 | Deaton et al. |
| 6,356,881 B1 | 3/2002 | Milch et al. |
| 6,360,209 B1 | 3/2002 | Loeb et al. |
| 6,360,954 B1 | 3/2002 | Barnardo |
| 6,366,220 B1 | 4/2002 | Elliott |
| 6,366,967 B1 | 4/2002 | Wagner |
| 6,373,969 B1 | 4/2002 | Adler |
| 6,374,230 B1 | 4/2002 | Walker et al. |
| 6,377,669 B1 | 4/2002 | Walker et al. |
| 6,377,935 B1 | 4/2002 | Deaton et al. |
| 6,382,677 B1 | 5/2002 | Kaule et al. |
| 6,385,591 B1 | 5/2002 | Mankoff |
| 6,385,594 B1 | 5/2002 | Lebda et al. |
| 6,386,444 B1 | 5/2002 | Sullivan |
| 6,397,202 B1 | 5/2002 | Higgins et al. |
| 6,402,039 B1 | 6/2002 | Freeman et al. |
| 6,404,866 B1 | 6/2002 | Hopper et al. |
| 6,405,175 B1 | 6/2002 | Ng |
| 6,405,181 B2 | 6/2002 | Lent et al. |
| 6,405,182 B1 | 6/2002 | Cuervo |
| 6,409,080 B2 | 6/2002 | Kawagishi |
| 6,409,593 B1 | 6/2002 | Petrecca |
| 6,411,947 B1 | 6/2002 | Rice et al. |
| 6,419,161 B1 | 7/2002 | Haddad |
| 6,422,459 B1 | 7/2002 | Kawan |
| 6,422,462 B1 | 7/2002 | Cohen |
| 6,424,029 B1 | 7/2002 | Giesler |
| 6,424,947 B1 | 7/2002 | Tsuria et al. |
| 6,424,949 B1 | 7/2002 | Deaton et al. |
| 6,424,951 B1 | 7/2002 | Shurling et al. |
| 6,429,927 B1 | 8/2002 | Borza |
| 6,434,259 B1 | 8/2002 | Hamid et al. |
| 6,434,534 B1 | 8/2002 | Walker et al. |
| D462,477 S | 9/2002 | Osborne |
| 6,446,210 B1 | 9/2002 | Borza |
| 6,450,407 B1 | 9/2002 | Freeman et al. |
| 6,454,647 B1 | 9/2002 | Woodbury, Jr. |
| 6,456,981 B1 | 9/2002 | Dejaeger et al. |
| 6,463,039 B1 | 10/2002 | Ricci et al. |
| 6,467,684 B2 | 10/2002 | Fite et al. |
| 6,470,306 B1 | 10/2002 | Pringle et al. |
| 6,471,128 B1 | 10/2002 | Corcoran et al. |
| 6,473,500 B1 | 10/2002 | Risafi et al. |
| 6,481,125 B1 | 11/2002 | Pokrasoff |
| 6,484,144 B2 | 11/2002 | Martin et al. |
| 6,484,146 B2 | 11/2002 | Day et al. |
| 6,484,148 B1 | 11/2002 | Boyd |
| 6,484,428 B1 | 11/2002 | Greenwald et al. |
| D466,929 S | 12/2002 | Haas |
| D467,271 S | 12/2002 | Haas |
| D467,272 S | 12/2002 | Haas |
| 6,488,206 B1 | 12/2002 | Flaig et al. |
| 6,490,568 B1 | 12/2002 | Omara et al. |
| 6,491,782 B1 | 12/2002 | Jaynes |
| 6,498,861 B1 | 12/2002 | Hamid et al. |
| D468,789 S | 1/2003 | Arnold et al. |
| 6,505,095 B1 | 1/2003 | Kolls |
| 6,505,168 B1 | 1/2003 | Rothman et al. |
| 6,505,780 B1 | 1/2003 | Yassin et al. |
| 6,507,644 B1 | 1/2003 | Henderson et al. |
| 6,513,019 B2 | 1/2003 | Lewis |
| 6,516,302 B1 | 2/2003 | Deaton et al. |
| 6,529,880 B1 | 3/2003 | McKeen et al. |
| 6,553,113 B1 | 4/2003 | Dhir et al. |
| 6,557,039 B1 | 4/2003 | Leong et al. |
| D474,235 S | 5/2003 | Haas |
| 6,557,750 B1 | 5/2003 | Druse et al. |
| 6,557,766 B1 | 5/2003 | Leighton |
| 6,558,255 B2 | 5/2003 | Walker et al. |
| 6,560,578 B2 | 5/2003 | Eldering |
| 6,560,581 B1 | 5/2003 | Fox et al. |
| 6,561,657 B1 | 5/2003 | Schofield |
| 6,564,189 B1 | 5/2003 | Nycz |
| 6,567,786 B1 | 5/2003 | Bibelnieks et al. |
| 6,567,791 B2 | 5/2003 | Lent et al. |
| 6,567,821 B1 | 5/2003 | Polk |
| 6,571,216 B1 | 5/2003 | Garg et al. |
| 6,574,603 B1 | 6/2003 | Dickson et al. |
| 6,575,361 B1 | 6/2003 | Graves et al. |
| 6,578,012 B1 | 6/2003 | Storey |
| 6,581,839 B1 | 6/2003 | Lasch et al. |
| 6,581,845 B2 | 6/2003 | Ye |
| D476,681 S | 7/2003 | Al Amri |
| D476,683 S | 7/2003 | Kilburn |
| D477,359 S | 7/2003 | Haas |
| D477,634 S | 7/2003 | Malone |
| 6,592,044 B1 | 7/2003 | Wong et al. |
| 6,594,640 B1 | 7/2003 | Postrel |
| 6,601,040 B1 | 7/2003 | Kolls |
| 6,601,761 B1 | 8/2003 | Katis |
| 6,607,127 B2 | 8/2003 | Wong |
| 6,609,104 B1 | 8/2003 | Deaton et al. |
| 6,609,111 B1 | 8/2003 | Bell |
| 6,609,113 B1 | 8/2003 | O'Leary et al. |

| | | |
|---|---|---|
| 6,609,654 B1 | 8/2003 | Anderson et al. |
| 6,609,658 B1 | 8/2003 | Sehr |
| 6,611,811 B1 | 8/2003 | Deaton et al. |
| 6,611,819 B1 | 8/2003 | Oneda |
| RE38,255 E | 9/2003 | Levine et al. |
| 6,615,189 B1 | 9/2003 | Phillips et al. |
| 6,615,190 B1 | 9/2003 | Slater |
| 6,625,582 B2 | 9/2003 | Richman et al. |
| D481,067 S | 10/2003 | Haas |
| D481,068 S | 10/2003 | Blossom et al. |
| 6,631,849 B2 | 10/2003 | Blossom |
| 6,641,049 B2 | 11/2003 | Luu |
| 6,641,050 B2 | 11/2003 | Kelley et al. |
| 6,644,551 B2 | 11/2003 | Clayman et al. |
| 6,647,374 B2 | 11/2003 | Kansal |
| 6,647,376 B1 | 11/2003 | Farrar et al. |
| D483,407 S | 12/2003 | Ramnarine |
| 6,655,587 B2 | 12/2003 | Andrews et al. |
| 6,655,598 B1 | 12/2003 | Curiel |
| 6,659,259 B2 | 12/2003 | Knox et al. |
| 6,662,215 B1 | 12/2003 | Moskowitz et al. |
| 6,671,673 B1 | 12/2003 | Baseman et al. |
| D485,573 S | 1/2004 | Li |
| 6,675,127 B2 | 1/2004 | LaBlanc et al. |
| 6,675,149 B1 | 1/2004 | Ruffin et al. |
| 6,684,195 B1 | 1/2004 | Deaton et al. |
| 6,693,544 B1 | 2/2004 | Hebbecker |
| 6,705,518 B2 | 3/2004 | Park et al. |
| 6,714,919 B1 | 3/2004 | Findley |
| 6,715,797 B2 | 4/2004 | Curiel |
| 6,718,313 B1 | 4/2004 | Lent et al. |
| 6,721,743 B1 | 4/2004 | Sakakibara |
| 6,726,813 B2 | 4/2004 | Kaule et al. |
| 6,727,802 B2 | 4/2004 | Kelly et al. |
| 6,732,919 B2 | 5/2004 | Macklin et al. |
| 6,742,125 B1 | 5/2004 | Gabber et al. |
| D490,840 S | 6/2004 | Arakaki et al. |
| D491,186 S | 6/2004 | Arakaki et al. |
| D491,953 S | 6/2004 | Arakaki et al. |
| 6,742,704 B2 | 6/2004 | Fitzmaurice et al. |
| 6,745,938 B2 | 6/2004 | Sullivan |
| 6,754,640 B2 | 6/2004 | Bozeman |
| 6,757,660 B2 | 6/2004 | Canada et al. |
| 6,757,710 B2 | 6/2004 | Reed |
| D493,195 S | 7/2004 | Creighton |
| 6,764,014 B2 | 7/2004 | Lasch et al. |
| D495,736 S | 9/2004 | Scharf |
| D496,365 S | 9/2004 | Liu et al. |
| 6,793,131 B2 | 9/2004 | Hogan |
| 6,793,135 B1 | 9/2004 | Ryoo |
| 6,795,809 B2 | 9/2004 | O'Brien et al. |
| 6,795,812 B1 | 9/2004 | Lent et al. |
| 6,802,008 B1 | 10/2004 | Ikefuji et al. |
| 6,804,786 B1 | 10/2004 | Chamley et al. |
| 6,805,287 B2 | 10/2004 | Bishop |
| 6,805,288 B2 | 10/2004 | Routhenstein et al. |
| 6,805,289 B2 | 10/2004 | Noriega et al. |
| D498,236 S | 11/2004 | Liu et al. |
| 6,814,282 B2 | 11/2004 | Seifert et al. |
| 6,817,008 B2 | 11/2004 | Leford et al. |
| 6,817,521 B1 | 11/2004 | Matada |
| 6,820,061 B2 | 11/2004 | Postrel |
| 6,829,586 B2 | 12/2004 | Postrel |
| 6,834,796 B2 | 12/2004 | Anvekar et al. |
| 6,842,739 B2 | 1/2005 | Postrel |
| 6,845,906 B2 | 1/2005 | Royer et al. |
| D501,875 S | 2/2005 | Dean |
| 6,856,973 B1 | 2/2005 | Bott |
| 6,857,566 B2 | 2/2005 | Wankmueller |
| RE38,717 E | 3/2005 | Wyborny et al. |
| 6,865,547 B1 | 3/2005 | Brake, Jr. et al. |
| 6,868,426 B1 | 3/2005 | Mankoff |
| 6,874,139 B2 | 3/2005 | Krueger et al. |
| 6,876,971 B1 | 4/2005 | Burke |
| 6,880,084 B1 | 4/2005 | Brittenham et al. |
| 6,885,994 B1 | 4/2005 | Scroggie et al. |
| 6,886,046 B2 | 4/2005 | Stutz et al. |
| D505,450 S | 5/2005 | Lauer et al. |
| 6,886,741 B1 | 5/2005 | Salveson |
| 6,889,198 B2 | 5/2005 | Kawan |
| 6,892,187 B2 | 5/2005 | Phillips et al. |
| 6,895,383 B2 | 5/2005 | Heinrich |
| 6,895,386 B1 | 5/2005 | Bachman et al. |
| 6,901,372 B1 | 5/2005 | Helzerman |
| 6,901,375 B2 | 5/2005 | Fernandez |
| 6,901,406 B2 | 5/2005 | Nabe et al. |
| 6,912,502 B1 | 6/2005 | Buddle et al. |
| 6,913,193 B1 | 7/2005 | Kawan |
| 6,915,271 B1 | 7/2005 | Meyer et al. |
| 6,920,611 B1 | 7/2005 | Spaeth et al. |
| 6,924,026 B2 | 8/2005 | Jaynes |
| 6,931,382 B2 | 8/2005 | Laage et al. |
| 6,938,156 B2 | 8/2005 | Wheeler et al. |
| RE38,801 E | 9/2005 | Rogers |
| 6,942,156 B2 | 9/2005 | Ohta et al. |
| 6,942,569 B2 | 9/2005 | Petracca |
| 6,945,453 B1 | 9/2005 | Schwarz, Jr. |
| 6,947,898 B2 | 9/2005 | Postrel |
| 6,950,940 B2 | 9/2005 | Wheeler et al. |
| 6,954,741 B1 | 10/2005 | Burchetta et al. |
| 6,961,710 B1 | 11/2005 | Yanagisawa et al. |
| 6,963,857 B1 | 11/2005 | Johnson |
| 6,970,830 B1 | 11/2005 | Samra et al. |
| 6,978,369 B2 | 12/2005 | Wheeler et al. |
| 6,985,879 B2 | 1/2006 | Walker et al. |
| 6,999,569 B2 | 2/2006 | Risafi et al. |
| 6,999,938 B1 | 2/2006 | Libman |
| 6,999,943 B1 | 2/2006 | Johnson et al. |
| 7,003,476 B1 | 2/2006 | Samra et al. |
| 7,006,979 B1 | 2/2006 | Samra et al. |
| 7,006,992 B1 | 2/2006 | Packwood |
| 7,010,495 B1 | 3/2006 | Samra et al. |
| 7,014,110 B2 | 3/2006 | Minowa et al. |
| 7,024,374 B1 | 4/2006 | Day et al. |
| 7,025,256 B1 | 4/2006 | Drummond et al. |
| 7,031,908 B1 | 4/2006 | Huang et al. |
| 7,031,939 B1 | 4/2006 | Gallagher et al. |
| 7,039,600 B1 | 5/2006 | Meek et al. |
| 7,047,222 B1 | 5/2006 | Bush |
| 7,050,996 B1 | 5/2006 | Blagg et al. |
| 7,051,001 B1 | 5/2006 | Slater |
| 7,051,925 B2 | 5/2006 | Schwarz, Jr. |
| 7,051,929 B2 | 5/2006 | Li |
| 7,054,842 B2 | 5/2006 | James et al. |
| 7,063,924 B2 | 6/2006 | Kaminsky et al. |
| D524,859 S | 7/2006 | Graves et al. |
| 7,070,095 B1 | 7/2006 | Gandel et al. |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,082,416 B2 | 7/2006 | Anderson |
| 7,083,084 B2 | 8/2006 | Graves et al. |
| 7,089,202 B1 | 8/2006 | McNamar et al. |
| 7,089,503 B1 | 8/2006 | Bloomquist et al. |
| 7,090,138 B2 | 8/2006 | Rettenmyer et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively et al. |
| 7,113,914 B1 | 9/2006 | Spielmann et al. |
| D530,741 S | 10/2006 | Blossom |
| 7,120,601 B2 | 10/2006 | Chen et al. |
| 7,121,471 B2 | 10/2006 | Beenau et al. |
| 7,128,272 B2 | 10/2006 | Doublet |
| 7,143,063 B2 | 11/2006 | Lent et al. |
| D533,220 S | 12/2006 | Graves et al. |
| 7,156,301 B1 | 1/2007 | Bonalle et al. |
| 7,163,153 B2 | 1/2007 | Blossom |
| 7,165,049 B2 | 1/2007 | Slater |
| 7,167,844 B1 | 1/2007 | Leong et al. |
| 7,171,385 B1 | 1/2007 | Dembo et al. |
| 7,184,973 B2 | 2/2007 | Monteleone et al. |
| D538,349 S | 3/2007 | Hollands |
| 7,191,952 B2 | 3/2007 | Blossom |
| 7,195,154 B2 | 3/2007 | Routhenstein |
| 7,216,091 B1 | 5/2007 | Blandina et al. |
| 7,216,099 B2 | 5/2007 | Chen et al. |
| 7,225,155 B1 | 5/2007 | Polk |

| | | |
|---|---|---|
| 7,228,155 B2 | 6/2007 | Saunders |
| 7,239,226 B2 | 7/2007 | Berardi et al. |
| 7,243,839 B2 | 7/2007 | Beck et al. |
| 7,249,092 B2 | 7/2007 | Dunn et al. |
| 7,249,097 B2 | 7/2007 | Hutchison et al. |
| 7,249,099 B2 | 7/2007 | Ling |
| 7,249,112 B2 | 7/2007 | Berardi et al. |
| 7,252,223 B2 | 8/2007 | Schofield |
| 7,252,226 B2 | 8/2007 | Risafi et al. |
| 7,254,560 B2 | 8/2007 | Singhal |
| D551,705 S | 9/2007 | Mershon |
| 7,266,524 B1 | 9/2007 | Butcher, III |
| 7,275,160 B2 | 9/2007 | Pearson et al. |
| 7,295,999 B1 | 11/2007 | Simon et al. |
| 7,306,141 B1 | 12/2007 | Schwarz, Jr. |
| 7,306,163 B2 | 12/2007 | Scholz et al. |
| 7,310,617 B1 | 12/2007 | Cunningham |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| D562,888 S | 2/2008 | Brown |
| 7,333,948 B2 | 2/2008 | Bell et al. |
| 7,340,431 B1 | 3/2008 | McManus et al. |
| 7,346,562 B2 | 3/2008 | Inoue et al. |
| 7,346,567 B2 | 3/2008 | Weeks |
| 7,349,866 B2 | 3/2008 | Schwarz |
| 7,357,331 B2 | 4/2008 | Blossom |
| 7,359,880 B2 | 4/2008 | Abel et al. |
| 7,360,693 B1 | 4/2008 | Sullivan |
| 7,370,004 B1 | 5/2008 | Patel et al. |
| 7,392,221 B2 | 6/2008 | Nabe |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,398,248 B2 | 7/2008 | Phillips et al. |
| 7,401,049 B2 | 7/2008 | Hobbs et al. |
| 7,401,731 B1 | 7/2008 | Pletz et al. |
| D576,671 S | 9/2008 | Field et al. |
| D582,476 S | 12/2008 | Field et al. |
| D582,977 S | 12/2008 | Field et al. |
| 7,461,028 B2 | 12/2008 | Wronski, Jr. |
| 7,467,096 B2 | 12/2008 | Antonucci et al. |
| 7,479,320 B2 | 1/2009 | Keller et al. |
| 7,493,288 B2 | 2/2009 | Biship et al. |
| 7,494,057 B2 | 2/2009 | Lasch et al. |
| 7,502,758 B2 | 3/2009 | Burke |
| 7,503,503 B2 | 3/2009 | Riedl et al. |
| 7,506,806 B2 | 3/2009 | Bonalle et al. |
| 7,530,491 B2 | 5/2009 | Lasch et al. |
| 7,580,857 B2 | 8/2009 | VanFleet et al. |
| 7,587,363 B2 | 9/2009 | Cataline et al. |
| 7,588,184 B2 | 9/2009 | Gandel et al. |
| 7,591,416 B2 | 9/2009 | Blossom |
| D602,522 S | 10/2009 | Field et al. |
| D602,986 S | 10/2009 | Skelding et al. |
| 7,606,730 B2 | 10/2009 | Antonucci |
| 7,630,935 B2 | 12/2009 | Loeger et al. |
| 7,660,763 B1 | 2/2010 | Brake, Jr. et al. |
| 7,676,425 B1 | 3/2010 | Noles |
| 7,689,504 B2 | 3/2010 | Warren et al. |
| 7,707,111 B2 | 4/2010 | Brake, Jr. et al. |
| 7,729,925 B2 | 6/2010 | Maritzen et al. |
| 7,729,980 B2 | 6/2010 | Mittenzwei et al. |
| 2001/0001856 A1 | 5/2001 | Gould et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0014868 A1 | 8/2001 | Herz et al. |
| 2001/0023407 A1 | 9/2001 | Liyanearachchi et al. |
| 2001/0025253 A1 | 9/2001 | Heintz et al. |
| 2001/0027389 A1 | 10/2001 | Beverina et al. |
| 2001/0027441 A1 | 10/2001 | Wankmueller |
| 2001/0029490 A1 | 10/2001 | Inamochi |
| 2001/0032312 A1 | 10/2001 | Runje et al. |
| 2001/0034647 A1 | 10/2001 | Marks et al. |
| 2001/0034651 A1 | 10/2001 | Marks et al. |
| 2001/0034663 A1 | 10/2001 | Teveler et al. |
| 2001/0034682 A1 | 10/2001 | Knight et al. |
| 2001/0034684 A1 | 10/2001 | Cushing et al. |
| 2001/0034718 A1 | 10/2001 | Shaked et al. |
| 2001/0037243 A1 | 11/2001 | Rouston et al. |
| 2001/0037276 A1 | 11/2001 | Kelly et al. |
| 2001/0037299 A1 | 11/2001 | Nichols et al. |
| 2001/0037315 A1 | 11/2001 | Saliba et al. |
| 2001/0038033 A1 | 11/2001 | Habib |
| 2001/0039511 A1 | 11/2001 | Duckworth et al. |
| 2001/0044293 A1 | 11/2001 | Morgan |
| 2001/0044733 A1 | 11/2001 | Lee et al. |
| 2001/0044764 A1 | 11/2001 | Arnold |
| 2001/0047332 A1 | 11/2001 | Gonen-Friedman et al. |
| 2001/0047342 A1 | 11/2001 | Cuervo |
| 2001/0049628 A1 | 12/2001 | Icho |
| 2001/0051917 A1 | 12/2001 | Bissonette et al. |
| 2001/0056398 A1 | 12/2001 | Scheirer |
| 2002/0002485 A1 | 1/2002 | O'Brien et al. |
| 2002/0002495 A1 | 1/2002 | Ullman |
| 2002/0004742 A1 | 1/2002 | Willcocks et al. |
| 2002/0007313 A1 | 1/2002 | Mai et al. |
| 2002/0010591 A1 | 1/2002 | Pomerance |
| 2002/0010621 A1 | 1/2002 | Bell et al. |
| 2002/0011517 A1 | 1/2002 | Namekawa et al. |
| 2002/0013751 A1 | 1/2002 | Facciani et al. |
| 2002/0019793 A1 | 2/2002 | Frattalone |
| 2002/0019803 A1 | 2/2002 | Muller |
| 2002/0026365 A1 | 2/2002 | Natanzon |
| 2002/0026416 A1 | 2/2002 | Provinse |
| 2002/0026418 A1 | 2/2002 | Koppel et al. |
| 2002/0029191 A1 | 3/2002 | Ishibashi et al. |
| 2002/0032609 A1 | 3/2002 | Wilkman |
| 2002/0032622 A1 | 3/2002 | Petit et al. |
| 2002/0035527 A1 | 3/2002 | Corrin |
| 2002/0040344 A1 | 4/2002 | Preiser et al. |
| 2002/0042742 A1 | 4/2002 | Glover et al. |
| 2002/0042774 A1 | 4/2002 | Ortiz et al. |
| 2002/0046089 A1 | 4/2002 | Zorn |
| 2002/0046110 A1 | 4/2002 | Gallagher |
| 2002/0046116 A1 | 4/2002 | Hohle et al. |
| 2002/0046255 A1 | 4/2002 | Moore et al. |
| 2002/0049605 A1 | 4/2002 | Hagi |
| 2002/0052778 A1 | 5/2002 | Murphy et al. |
| 2002/0052852 A1 | 5/2002 | Bozeman |
| 2002/0055874 A1 | 5/2002 | Cohen |
| 2002/0059103 A1 | 5/2002 | Anderson et al. |
| 2002/0059139 A1 | 5/2002 | Evans |
| 2002/0062235 A1 | 5/2002 | Wahlbin et al. |
| 2002/0062249 A1 | 5/2002 | Iannacci |
| 2002/0062253 A1 | 5/2002 | Dosh et al. |
| 2002/0062257 A1 | 5/2002 | Minamishin et al. |
| 2002/0062279 A1 | 5/2002 | Behrenbrinker et al. |
| 2002/0065712 A1 | 5/2002 | Kawan et al. |
| 2002/0065720 A1 | 5/2002 | Carswell et al. |
| 2002/0065735 A1 | 5/2002 | Hatakama et al. |
| 2002/0069104 A1 | 6/2002 | Beach et al. |
| 2002/0069109 A1 | 6/2002 | Wendkos |
| 2002/0069122 A1 | 6/2002 | Yun et al. |
| 2002/0069158 A1 | 6/2002 | Larkin et al. |
| 2002/0070270 A1 | 6/2002 | Narita et al. |
| 2002/0072931 A1 | 6/2002 | Card |
| 2002/0072974 A1 | 6/2002 | Pugliese et al. |
| 2002/0073019 A1 | 6/2002 | Deaton |
| 2002/0073030 A1 | 6/2002 | Offer |
| 2002/0077890 A1 | 6/2002 | LaPointe et al. |
| 2002/0077895 A1 | 6/2002 | Howell |
| 2002/0077904 A1 | 6/2002 | Ali |
| 2002/0077964 A1 | 6/2002 | Brody et al. |
| 2002/0077966 A1 | 6/2002 | Harycki et al. |
| 2002/0077978 A1 | 6/2002 | O'Leary et al. |
| 2002/0082920 A1 | 6/2002 | Austin et al. |
| 2002/0082962 A1 | 6/2002 | Farris et al. |
| 2002/0082990 A1 | 6/2002 | Jones |
| 2002/0087349 A1 | 7/2002 | Wong |
| 2002/0087373 A1 | 7/2002 | Dickstein et al. |
| 2002/0091567 A1 | 7/2002 | Royston |
| 2002/0091572 A1 | 7/2002 | Anderson et al. |
| 2002/0091631 A1 | 7/2002 | Usui |
| 2002/0091632 A1 | 7/2002 | Turock et al. |
| 2002/0091649 A1 | 7/2002 | Anvekar et al. |
| 2002/0095365 A1 | 7/2002 | Slavin et al. |

| | | | | | |
|---|---|---|---|---|---|
| 2002/0099586 A1 | 7/2002 | Bladen et al. | 2003/0004809 A1 | 1/2003 | Palcic et al. |
| 2002/0099601 A1 | 7/2002 | Farrell | 2003/0004828 A1 | 1/2003 | Epstein |
| 2002/0099649 A1 | 7/2002 | Lee et al. | 2003/0005288 A1 | 1/2003 | Moskowitz et al. |
| 2002/0099667 A1 | 7/2002 | Diamandis et al. | 2003/0009374 A1 | 1/2003 | Moodie et al. |
| 2002/0103852 A1 | 8/2002 | Pushka | 2003/0009379 A1 | 1/2003 | Narasimhan et al. |
| 2002/0104878 A1 | 8/2002 | Seifert et al. | 2003/0009393 A1 | 1/2003 | Norris |
| 2002/0107731 A1 | 8/2002 | Teng | 2003/0010831 A1 | 1/2003 | Ye |
| 2002/0111859 A1 | 8/2002 | Sheldon et al. | 2003/0018523 A1 | 1/2003 | Rappaport et al. |
| 2002/0111860 A1 | 8/2002 | Jones | 2003/0018549 A1 | 1/2003 | Fei et al. |
| 2002/0111861 A1 | 8/2002 | Sakamoto et al. | 2003/0018613 A1 | 1/2003 | Oytac |
| 2002/0111886 A1 | 8/2002 | Chenevich et al. | 2003/0023549 A1 | 1/2003 | Armes et al. |
| 2002/0111891 A1 | 8/2002 | Hoffman et al. | 2003/0023557 A1 | 1/2003 | Moore |
| 2002/0111916 A1 | 8/2002 | Coronna et al. | 2003/0028483 A1 | 2/2003 | Sanders et al. |
| 2002/0116266 A1 | 8/2002 | Marshall | 2003/0028518 A1 | 2/2003 | Mankoff |
| 2002/0116271 A1 | 8/2002 | Mankoff | 2003/0031321 A1 | 2/2003 | Mages |
| 2002/0116330 A1 | 8/2002 | Hed et al. | 2003/0033211 A1 | 2/2003 | Haines et al. |
| 2002/0116331 A1 | 8/2002 | Cataline et al. | 2003/0033246 A1 | 2/2003 | Slater |
| 2002/0117541 A1 | 8/2002 | Biggar et al. | 2003/0033252 A1 | 2/2003 | Buttridge et al. |
| 2002/0120497 A1 | 8/2002 | King | 2003/0034388 A1 | 2/2003 | Routhenstein et al. |
| 2002/0120571 A1 | 8/2002 | Maung et al. | 2003/0036952 A1 | 2/2003 | Panttaja et al. |
| 2002/0120627 A1 | 8/2002 | Mankoff | 2003/0040927 A1 | 2/2003 | Sato et al. |
| 2002/0120642 A1 | 8/2002 | Fetherston | 2003/0040959 A1 | 2/2003 | Fei et al. |
| 2002/0120846 A1 | 8/2002 | Stewart et al. | 2003/0040964 A1 | 2/2003 | Lacek |
| 2002/0123926 A1 | 9/2002 | Bushold et al. | 2003/0046249 A1 | 3/2003 | Wu |
| 2002/0123946 A1 | 9/2002 | Haworth et al. | 2003/0046542 A1 | 3/2003 | Chen et al. |
| 2002/0123955 A1 | 9/2002 | Andreski et al. | 2003/0048888 A1 | 3/2003 | Hopper et al. |
| 2002/0128916 A1 | 9/2002 | Beinecke | 2003/0050831 A1 | 3/2003 | Klayh |
| 2002/0129221 A1 | 9/2002 | Borgin et al. | 2003/0053609 A1 | 3/2003 | Risafi et al. |
| 2002/0133401 A1 | 9/2002 | Mount et al. | 2003/0055780 A1 | 3/2003 | Hansen et al. |
| 2002/0133461 A1 | 9/2002 | Ramachandran | 2003/0055782 A1 | 3/2003 | Slater |
| 2002/0138409 A1 | 9/2002 | Bass | 2003/0055783 A1 | 3/2003 | Cataline et al. |
| 2002/0138418 A1 | 9/2002 | Zarin et al. | 2003/0061093 A1 | 3/2003 | Todd |
| 2002/0143614 A1 | 10/2002 | MacLean et al. | 2003/0061097 A1 | 3/2003 | Walker et al. |
| 2002/0143621 A1 | 10/2002 | Donnelly et al. | 2003/0061098 A1 | 3/2003 | Meyer |
| 2002/0143626 A1 | 10/2002 | Voltmer et al. | 2003/0061168 A1 | 3/2003 | Routhenstein |
| 2002/0143703 A1 | 10/2002 | Razvan et al. | 2003/0065618 A1 | 4/2003 | VanDeBoe, Jr. |
| 2002/0145039 A1 | 10/2002 | Carroll | 2003/0065624 A1 | 4/2003 | James et al. |
| 2002/0147633 A1 | 10/2002 | Rafizadeh | 2003/0069808 A1 | 4/2003 | Cardno |
| 2002/0147662 A1 | 10/2002 | Anderson | 2003/0074167 A1 | 4/2003 | Browne et al. |
| 2002/0147683 A1 | 10/2002 | Capobianco et al. | 2003/0074290 A1 | 4/2003 | Clore |
| 2002/0147691 A1 | 10/2002 | Davis et al. | 2003/0078815 A1 | 4/2003 | Parsons |
| 2002/0152116 A1 | 10/2002 | Yan et al. | 2003/0078881 A1 | 4/2003 | Elliott et al. |
| 2002/0152118 A1 | 10/2002 | Hadjigeorgis | 2003/0083933 A1 | 5/2003 | McAlear |
| 2002/0152123 A1 | 10/2002 | Giordano et al. | 2003/0085272 A1 | 5/2003 | Andrews et al. |
| 2002/0152168 A1 | 10/2002 | Neofytides et al. | 2003/0085286 A1 | 5/2003 | Kelley et al. |
| 2002/0152179 A1 | 10/2002 | Racov | 2003/0088462 A1 | 5/2003 | Carrither et al. |
| 2002/0156723 A1 | 10/2002 | Lilly et al. | 2003/0088470 A1 | 5/2003 | Cuervo |
| 2002/0161630 A1 | 10/2002 | Kern et al. | 2003/0097298 A1 | 5/2003 | Klimpl et al. |
| 2002/0161641 A1 | 10/2002 | Quinlan et al. | 2003/0101119 A1 | 5/2003 | Persons et al. |
| 2002/0161699 A1 | 10/2002 | Okamoto et al. | 2003/0101131 A1 | 5/2003 | Warren et al. |
| 2002/0161702 A1 | 10/2002 | Milberger et al. | 2003/0105672 A1 | 6/2003 | Epstein et al. |
| 2002/0165771 A1 | 11/2002 | Walker et al. | 2003/0105688 A1 | 6/2003 | Brown et al. |
| 2002/0165808 A1 | 11/2002 | Zamsky et al. | 2003/0105689 A1 | 6/2003 | Chandak et al. |
| 2002/0165820 A1 | 11/2002 | Anvekar et al. | 2003/0105714 A1 | 6/2003 | Alacron Luther et al. |
| 2002/0169671 A1 | 11/2002 | Junger | 2003/0110111 A1 | 6/2003 | Nalebuff et al. |
| 2002/0169719 A1 | 11/2002 | Dively et al. | 2003/0115100 A1 | 6/2003 | Teicher |
| 2002/0174011 A1 | 11/2002 | Sanchez et al. | 2003/0120544 A1 | 6/2003 | Gritzbach et al. |
| 2002/0174016 A1 | 11/2002 | Cuervo | 2003/0120571 A1 | 6/2003 | Blagg |
| 2002/0174018 A1 | 11/2002 | Bunger et al. | 2003/0125969 A1 | 7/2003 | Kizer et al. |
| 2002/0174030 A1 | 11/2002 | Praisner et al. | 2003/0126011 A1 | 7/2003 | Bryman et al. |
| 2002/0178025 A1 | 11/2002 | Hansen et al. | 2003/0130895 A1 | 7/2003 | Antonucci et al. |
| 2002/0178056 A1 | 11/2002 | Lim | 2003/0130940 A1 | 7/2003 | Hansen et al. |
| 2002/0178063 A1 | 11/2002 | Gravelle et al. | 2003/0130948 A1 | 7/2003 | Algiene et al. |
| 2002/0178112 A1 | 11/2002 | Goeller et al. | 2003/0135453 A1 | 7/2003 | Caulfield et al. |
| 2002/0187825 A1 | 12/2002 | Tracy et al. | 2003/0135459 A1 | 7/2003 | Abelman et al. |
| 2002/0188478 A1 | 12/2002 | Breeland et al. | 2003/0135462 A1 | 7/2003 | Brake, Jr. et al. |
| 2002/0188509 A1 | 12/2002 | Ariff et al. | 2003/0140004 A1 | 7/2003 | O'Leary et al. |
| 2002/0188511 A1 | 12/2002 | Johnson et al. | 2003/0144902 A1 | 7/2003 | Bowie |
| 2002/0188565 A1 | 12/2002 | Nakamura et al. | 2003/0144935 A1 | 7/2003 | Sobek |
| 2002/0190123 A1 | 12/2002 | Anvekar et al. | 2003/0149629 A1 | 8/2003 | Claridge et al. |
| 2002/0194071 A1 | 12/2002 | Yoshizaki et al. | 2003/0149660 A1 | 8/2003 | Canfield |
| 2002/0194081 A1 | 12/2002 | Perkowski | 2003/0154125 A1 | 8/2003 | Mittal et al. |
| 2002/0194098 A1 | 12/2002 | Stiff et al. | 2003/0154163 A1 | 8/2003 | Phillips et al. |
| 2002/0194119 A1 | 12/2002 | Wright et al. | 2003/0158776 A1 | 8/2003 | Landesmann |
| 2002/0198803 A1 | 12/2002 | Rowe | 2003/0158782 A1 | 8/2003 | Thomson et al. |
| 2002/0198807 A1 | 12/2002 | Kobayashi et al. | 2003/0158818 A1 | 8/2003 | George et al. |
| 2002/0198848 A1 | 12/2002 | Michener | 2003/0163403 A1 | 8/2003 | Chen et al. |
| 2003/0004794 A1 | 1/2003 | Hamilton | 2003/0163416 A1 | 8/2003 | Kitajima |
| 2003/0004803 A1 | 1/2003 | Glover et al. | 2003/0167218 A1 | 9/2003 | Field et al. |

| | | |
|---|---|---|
| 2003/0167220 A1 | 9/2003 | Schoen et al. |
| 2003/0171992 A1 | 9/2003 | Blagg et al. |
| 2003/0172040 A1 | 9/2003 | Kemper et al. |
| 2003/0182218 A1 | 9/2003 | Blagg |
| 2003/0182246 A1 | 9/2003 | Johnson et al. |
| 2003/0182247 A1 | 9/2003 | Mobed et al. |
| 2003/0187787 A1 | 10/2003 | Freund |
| 2003/0195805 A1 | 10/2003 | Storey |
| 2003/0195808 A1 | 10/2003 | Brown et al. |
| 2003/0195842 A1 | 10/2003 | Reece |
| 2003/0200141 A1 | 10/2003 | Robison |
| 2003/0200142 A1 | 10/2003 | Hicks et al. |
| 2003/0200143 A9 | 10/2003 | Walker et al. |
| 2003/0200179 A1 | 10/2003 | Kwan |
| 2003/0200180 A1 | 10/2003 | Phelan et al. |
| 2003/0204421 A1 | 10/2003 | Houle et al. |
| 2003/0205616 A1 | 11/2003 | Graves et al. |
| 2003/0205617 A1 | 11/2003 | Allen et al. |
| 2003/0208400 A1 | 11/2003 | Kuo et al. |
| 2003/0208439 A1 | 11/2003 | Rast |
| 2003/0212630 A1 | 11/2003 | Kahr |
| 2003/0213843 A1 | 11/2003 | Jackson |
| 2003/0216964 A1 | 11/2003 | MacLean et al. |
| 2003/0216965 A1 | 11/2003 | Libman |
| 2003/0216967 A1 | 11/2003 | Williams |
| 2003/0216998 A1 | 11/2003 | Chang et al. |
| 2003/0217003 A1 | 11/2003 | Weinflash et al. |
| 2003/0217005 A1 | 11/2003 | Drummond et al. |
| 2003/0217329 A1 | 11/2003 | Good |
| 2003/0218062 A1 | 11/2003 | Noriega et al. |
| 2003/0218066 A1 | 11/2003 | Fernandes et al. |
| 2003/0220834 A1 | 11/2003 | Leung et al. |
| 2003/0222136 A1 | 12/2003 | Bolle et al. |
| 2003/0225618 A1 | 12/2003 | Hessburg et al. |
| 2003/0225619 A1 | 12/2003 | Dokken et al. |
| 2003/0229525 A1 | 12/2003 | Callahan et al. |
| 2003/0229590 A1 | 12/2003 | Byrne et al. |
| 2003/0233255 A1 | 12/2003 | Dirienzo |
| 2003/0233278 A1 | 12/2003 | Marshall |
| 2003/0233292 A1 | 12/2003 | Richey et al. |
| 2003/0236704 A1 | 12/2003 | Antonucci |
| 2003/0236712 A1 | 12/2003 | Antonucci et al. |
| 2004/0002916 A1 | 1/2004 | Timmerman et al. |
| 2004/0006487 A1 | 1/2004 | Tari |
| 2004/0010447 A1 | 1/2004 | Asayama |
| 2004/0010462 A1 | 1/2004 | Moon et al. |
| 2004/0015394 A1 | 1/2004 | Mok et al. |
| 2004/0024672 A1 | 2/2004 | Brake, Jr. et al. |
| 2004/0024693 A1 | 2/2004 | Lawrence |
| 2004/0029569 A1 | 2/2004 | Khan et al. |
| 2004/0030626 A1 | 2/2004 | Libman |
| 2004/0039588 A1 | 2/2004 | Libman |
| 2004/0039686 A1 | 2/2004 | Klebanoff |
| 2004/0039687 A1 | 2/2004 | Lent et al. |
| 2004/0044606 A1 | 3/2004 | Buttridge et al. |
| 2004/0049451 A1 | 3/2004 | Berardi et al. |
| 2004/0049452 A1 | 3/2004 | Blagg |
| 2004/0059952 A1 | 3/2004 | Newport et al. |
| 2004/0064332 A1 | 4/2004 | Zou et al. |
| 2004/0064401 A1 | 4/2004 | Palaghita et al. |
| 2004/0064402 A1 | 4/2004 | Dreyer et al. |
| 2004/0078324 A1 | 4/2004 | Lonnberg et al. |
| 2004/0078328 A1 | 4/2004 | Talbert et al. |
| 2004/0078332 A1 | 4/2004 | Ferguson et al. |
| 2004/0088236 A1 | 5/2004 | Manning |
| 2004/0088238 A1 | 5/2004 | Gilson et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0111363 A1 | 6/2004 | Trench et al. |
| 2004/0111371 A1 | 6/2004 | Friedman |
| 2004/0117202 A1 | 6/2004 | Winklevoss et al. |
| 2004/0118914 A1 | 6/2004 | Smith et al. |
| 2004/0122736 A1 | 6/2004 | Strock et al. |
| 2004/0128186 A1 | 7/2004 | Breslin et al. |
| 2004/0128195 A1 | 7/2004 | Sorem |
| 2004/0128217 A1 | 7/2004 | Friedman et al. |
| 2004/0128248 A1 | 7/2004 | Fujihara et al. |
| 2004/0133787 A1 | 7/2004 | Doughty et al. |
| 2004/0138991 A1 | 7/2004 | Song et al. |
| 2004/0143526 A1 | 7/2004 | Monasterio et al. |
| 2004/0149544 A1 | 8/2004 | Dal Ferro |
| 2004/0155101 A1 | 8/2004 | Royer et al. |
| 2004/0158517 A1 | 8/2004 | Mahaney et al. |
| 2004/0159700 A1 | 8/2004 | Khan et al. |
| 2004/0172350 A1 | 9/2004 | Atkinson et al. |
| 2004/0172358 A1 | 9/2004 | Lent et al. |
| 2004/0177036 A1 | 9/2004 | Nutahara et al. |
| 2004/0181441 A1 | 9/2004 | Fung et al. |
| 2004/0186773 A1 | 9/2004 | George et al. |
| 2004/0193539 A1 | 9/2004 | Sullivan |
| 2004/0193540 A1 | 9/2004 | Brown et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0215507 A1 | 10/2004 | Levitt et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0243468 A1 | 12/2004 | Cohagan et al. |
| 2004/0243498 A1 | 12/2004 | Duke |
| 2004/0249689 A1 | 12/2004 | Naraki et al. |
| 2004/0249710 A1 | 12/2004 | Smith et al. |
| 2004/0249712 A1 | 12/2004 | Brown et al. |
| 2004/0249764 A1 | 12/2004 | Delitz et al. |
| 2004/0252012 A1 | 12/2004 | Beenau et al. |
| 2005/0004839 A1 | 1/2005 | Bakker et al. |
| 2005/0004864 A1 | 1/2005 | Lent et al. |
| 2005/0006286 A1 | 1/2005 | Fery et al. |
| 2005/0021353 A1 | 1/2005 | Aviles et al. |
| 2005/0021363 A1 | 1/2005 | Stimson et al. |
| 2005/0021400 A1 | 1/2005 | Postrel |
| 2005/0021405 A1 | 1/2005 | Agarwal |
| 2005/0021457 A1 | 1/2005 | Johnson et al. |
| 2005/0023346 A1 | 2/2005 | Bakker et al. |
| 2005/0027649 A1 | 2/2005 | Cech |
| 2005/0033619 A1 | 2/2005 | Barnes et al. |
| 2005/0033637 A1 | 2/2005 | Underwood |
| 2005/0035192 A1 | 2/2005 | Bonalle et al. |
| 2005/0035847 A1 | 2/2005 | Bonalle et al. |
| 2005/0040242 A1 | 2/2005 | Beenau et al. |
| 2005/0049950 A1 | 3/2005 | Johnson |
| 2005/0049965 A1 | 3/2005 | Jen |
| 2005/0055270 A1 | 3/2005 | Broe |
| 2005/0060260 A1 | 3/2005 | Masuda et al. |
| 2005/0065877 A1 | 3/2005 | Cleary et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071230 A1 | 3/2005 | Mankoff |
| 2005/0075889 A1 | 4/2005 | Gomes et al. |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0080672 A1 | 4/2005 | Courtion et al. |
| 2005/0086103 A1 | 4/2005 | Agura et al. |
| 2005/0086160 A1 | 4/2005 | Wong et al. |
| 2005/0086166 A1 | 4/2005 | Monk et al. |
| 2005/0086167 A1 | 4/2005 | Brake, Jr. et al. |
| 2005/0091104 A1 | 4/2005 | Abraham |
| 2005/0091138 A1 | 4/2005 | Awatsu |
| 2005/0091492 A1 | 4/2005 | Benson et al. |
| 2005/0096976 A1 | 5/2005 | Nelms |
| 2005/0097033 A1 | 5/2005 | Pretell et al. |
| 2005/0102178 A1 | 5/2005 | Phillips et al. |
| 2005/0102228 A1 | 5/2005 | Srinivasan et al. |
| 2005/0108090 A1 | 5/2005 | Takeda et al. |
| 2005/0108102 A1 | 5/2005 | York |
| 2005/0108151 A1 | 5/2005 | York |
| 2005/0108152 A1 | 5/2005 | Tsoa Lee et al. |
| 2005/0114883 A1 | 5/2005 | Nagai et al. |
| 2005/0119938 A1 | 6/2005 | Smith et al. |
| 2005/0119979 A1 | 6/2005 | Murashita et al. |
| 2005/0125292 A1 | 6/2005 | Kassab et al. |
| 2005/0125295 A1 | 6/2005 | Tidwell et al. |

| | | |
|---|---|---|
| 2005/0125296 A1 | 6/2005 | Tidwell et al. |
| 2005/0125315 A1 | 6/2005 | Munoz et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131761 A1 | 6/2005 | Trika et al. |
| 2005/0131792 A1 | 6/2005 | Rowe |
| 2005/0137951 A1 | 6/2005 | Michelassi et al. |
| 2005/0137982 A1 | 6/2005 | Michelassi et al. |
| 2005/0144071 A1 | 6/2005 | Monahan et al. |
| 2005/0144074 A1 | 6/2005 | Fredregill et al. |
| 2005/0144105 A1 | 6/2005 | Czyzewski |
| 2005/0144143 A1 | 6/2005 | Freiberg |
| 2005/0149386 A1 | 7/2005 | Agura et al. |
| 2005/0149393 A1 | 7/2005 | Leof |
| 2005/0149440 A1 | 7/2005 | Michelassi et al. |
| 2005/0154664 A1 | 7/2005 | Guy et al. |
| 2005/0159986 A1 | 7/2005 | Breeland et al. |
| 2005/0160003 A1 | 7/2005 | Berardi et al. |
| 2005/0160051 A1 | 7/2005 | Johnson |
| 2005/0167342 A1 | 8/2005 | Vullride et al. |
| 2005/0167488 A1 | 8/2005 | Higgins et al. |
| 2005/0171839 A1 | 8/2005 | Corriere |
| 2005/0171842 A1 | 8/2005 | Tien et al. |
| 2005/0171898 A1 | 8/2005 | Bishop et al. |
| 2005/0171901 A1 | 8/2005 | Rosenblatt et al. |
| 2005/0177503 A1 | 8/2005 | Thomas |
| 2005/0177523 A1 | 8/2005 | Weiss et al. |
| 2005/0179251 A1 | 8/2005 | Wagoner et al. |
| 2005/0182654 A1 | 8/2005 | Abolfathi et al. |
| 2005/0182735 A1 | 8/2005 | Zager et al. |
| 2005/0187820 A1 | 8/2005 | Mohan |
| 2005/0189427 A1 | 9/2005 | Brown et al. |
| 2005/0192862 A1 | 9/2005 | Modi |
| 2005/0197904 A1 | 9/2005 | Baron et al. |
| 2005/0199705 A1 | 9/2005 | Beck et al. |
| 2005/0199708 A1 | 9/2005 | Friedman |
| 2005/0203824 A1 | 9/2005 | Freud et al. |
| 2005/0203857 A1 | 9/2005 | Friedman |
| 2005/0205666 A1 | 9/2005 | Ward et al. |
| 2005/0206499 A1 | 9/2005 | Fisher |
| 2005/0209914 A1 | 9/2005 | Nguyen et al. |
| 2005/0209917 A1 | 9/2005 | Anderson et al. |
| 2005/0216346 A1 | 9/2005 | Kusumoto et al. |
| 2005/0216888 A1 | 9/2005 | Drummond et al. |
| 2005/0222906 A1 | 10/2005 | Chen |
| 2005/0234769 A1 | 10/2005 | Jain et al. |
| 2005/0234771 A1 | 10/2005 | Register et al. |
| 2005/0234773 A1 | 10/2005 | Hirst et al. |
| 2005/0234789 A1 | 10/2005 | Czyzewski et al. |
| 2005/0240474 A1 | 10/2005 | Li |
| 2005/0240477 A1 | 10/2005 | Friday et al. |
| 2005/0242179 A1 | 11/2005 | Warwick |
| 2005/0246289 A1 | 11/2005 | Alexander et al. |
| 2005/0246627 A1 | 11/2005 | Sayed |
| 2005/0251446 A1 | 11/2005 | Jiang et al. |
| 2005/0251470 A1 | 11/2005 | Sullivan |
| 2005/0256794 A1 | 11/2005 | Colby |
| 2005/0256802 A1 | 11/2005 | Ammermann et al. |
| 2005/0261916 A1 | 11/2005 | McCall et al. |
| 2005/0261995 A1 | 11/2005 | Phelan |
| 2005/0267800 A1 | 12/2005 | Tietzen et al. |
| 2005/0269396 A1 | 12/2005 | Schofield |
| 2005/0273386 A1 | 12/2005 | Weidner |
| 2005/0273387 A1 | 12/2005 | Previdi |
| 2005/0273425 A1 | 12/2005 | Yamazaki |
| 2005/0278215 A1 | 12/2005 | Seele, Jr. |
| 2005/0283429 A1 | 12/2005 | Bates et al. |
| 2005/0288998 A1 | 12/2005 | Verma et al. |
| 2005/0289003 A1 | 12/2005 | Thompson et al. |
| 2005/0289044 A1 | 12/2005 | Breslin et al. |
| 2006/0004629 A1 | 1/2006 | Neemann et al. |
| 2006/0010033 A1 | 1/2006 | Thomas |
| 2006/0010034 A1 | 1/2006 | Sparks |
| 2006/0011719 A1 | 1/2006 | Lehtonen et al. |
| 2006/0015463 A1 | 1/2006 | Gupta et al. |
| 2006/0020507 A1 | 1/2006 | Sagey |
| 2006/0020542 A1 | 1/2006 | Litle |
| 2006/0026073 A1 | 2/2006 | Kenny et al. |
| 2006/0026092 A1 | 2/2006 | Klein et al. |
| 2006/0031718 A1 | 2/2006 | Thornhill et al. |
| 2006/0036543 A1 | 2/2006 | Blagg et al. |
| 2006/0036553 A1 | 2/2006 | Gupta et al. |
| 2006/0039733 A1 | 2/2006 | Meyerhofer |
| 2006/0041540 A1 | 2/2006 | Shannon |
| 2006/0047573 A1 | 3/2006 | Mitchell et al. |
| 2006/0047589 A1 | 3/2006 | Grau |
| 2006/0064329 A1 | 3/2006 | Abolfathi et al. |
| 2006/0074794 A1 | 4/2006 | Nespola, Jr. |
| 2006/0080230 A1 | 4/2006 | Freiberg |
| 2006/0080243 A1 | 4/2006 | Kemper et al. |
| 2006/0080254 A1 | 4/2006 | Chigira et al. |
| 2006/0085334 A1 | 4/2006 | Murphy |
| 2006/0095350 A1 | 5/2006 | Hall et al. |
| 2006/0106696 A1 | 5/2006 | Carlson |
| 2006/0116903 A1 | 6/2006 | Becerra |
| 2006/0116955 A1 | 6/2006 | Strayer et al. |
| 2006/0122918 A1 | 6/2006 | Graboske et al. |
| 2006/0131869 A1 | 6/2006 | Brignull |
| 2006/0143077 A1 | 6/2006 | Prorock |
| 2006/0143117 A1 | 6/2006 | Chigira et al. |
| 2006/0149671 A1 | 7/2006 | Nix et al. |
| 2006/0157557 A1 | 7/2006 | Lee et al. |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0261927 A1 | 11/2006 | Kelly et al. |
| 2006/0289636 A1 | 12/2006 | Hoblit |
| 2007/0020443 A1 | 1/2007 | Lo |
| 2007/0034700 A1 | 2/2007 | Poidomani et al. |
| 2007/0038515 A1 | 2/2007 | Postrel |
| 2007/0063025 A1 | 3/2007 | Blossom |
| 2007/0078719 A1 | 4/2007 | Schmitt et al. |
| 2007/0124227 A1 | 5/2007 | Dembo et al. |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0226097 A1 | 9/2007 | Keechle |
| 2007/0265924 A1 | 11/2007 | Schwarz |
| 2008/0005018 A1 | 1/2008 | Powell |
| 2008/0010202 A1 | 1/2008 | Schwarz |
| 2008/0019281 A1 | 1/2008 | Liger et al. |
| 2008/0027841 A1 | 1/2008 | Eder |
| 2008/0177659 A1 | 7/2008 | Lacey et al. |
| 2008/0187770 A1 | 8/2008 | Funicelli et al. |
| 2008/0215470 A1 | 9/2008 | Sengupta et al. |
| 2008/0230600 A1 | 9/2008 | Black et al. |
| 2008/0245865 A1 | 10/2008 | Mosteller |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0043651 A1 | 2/2009 | Schwarz |
| 2009/0048972 A1 | 2/2009 | Bierer et al. |
| 2009/0150370 A1 | 6/2009 | Christensen et al. |
| 2009/0230195 A1 | 9/2009 | Lasch et al. |
| 2009/0240620 A1 | 9/2009 | Kendrick et al. |
| 2009/0242645 A1 | 10/2009 | Komatsu et al. |
| 2009/0250522 A1 | 10/2009 | Williams et al. |
| 2009/0261161 A1 | 10/2009 | Blossom |
| 2009/0265275 A1 | 10/2009 | Everhart |
| 2009/0271853 A1 | 10/2009 | Everhart |
| 2009/0313106 A1 | 12/2009 | Taylor et al. |
| 2010/0030675 A1 | 2/2010 | Hanan et al. |
| 2010/0030697 A1 | 2/2010 | Goodrich et al. |

FOREIGN PATENT DOCUMENTS

| | | |
|---|---|---|
| DE | 19702532 | 3/1998 |
| DE | 102006015818 | 10/2007 |
| EP | 0843292 A2 | 5/1998 |
| EP | 0855659 | 7/1998 |
| EP | 959440 | 11/1999 |

| | | |
|---|---|---|
| EP | 0590861 | 1/2001 |
| GB | 2275654 A | 9/1994 |
| GB | 2376787 | 12/2002 |
| GB | 2377071 | 12/2002 |
| GB | 2377314 | 1/2003 |
| JP | 53-118104 | 10/1978 |
| JP | 64-87397 | 3/1989 |
| JP | 3-114879 | 5/1991 |
| JP | 4-073193 | 3/1992 |
| JP | 4-201392 | 7/1992 |
| JP | 5-011676 | 1/1993 |
| JP | 8-080680 | 3/1996 |
| JP | 8-096098 | 4/1996 |
| JP | 10-116016 | 5/1998 |
| JP | 2000-113151 | 4/2000 |
| JP | 2002-259933 | 9/2002 |
| JP | 2002-366015 | 12/2002 |
| JP | 2005-246658 | 9/2005 |
| JP | 2008-015071 | 1/2008 |
| WO | WO 94/29112 | 12/1994 |
| WO | WO 97/20692 | 6/1997 |
| WO | WO 97/41673 | 11/1997 |
| WO | WO 98/10368 | 3/1998 |
| WO | WO 98/59307 | 12/1998 |
| WO | WO 99/05633 | 2/1999 |
| WO | WO 99/54841 | 10/1999 |
| WO | WO 01/11532 | 2/2001 |
| WO | WO 01/18699 | 3/2001 |
| WO | WO 01/39347 A2 | 9/2001 |
| WO | WO 01/69347 | 9/2001 |
| WO | WO 01/69347 A3 | 9/2001 |
| WO | WO 01/88659 | 11/2001 |
| WO | WO 2005/043277 | 5/2005 |
| WO | WO 2005/101975 | 11/2005 |
| WO | WO 2006/060370 | 6/2006 |
| WO | WO 2006/105092 | 10/2006 |
| WO | WO 2006/116772 | 11/2006 |
| WO | WO 2007/115725 | 10/2007 |
| WO | WO 2008/021381 | 2/2008 |
| WO | WO 2008/021382 | 2/2008 |
| WO | WO 2009/023817 | 2/2009 |

OTHER PUBLICATIONS

5500—FDIC General Counsel's Opinion No. 8—Stored Value Cards, 61 Fed. Reg. 40490, http//www.fdic.gov/regulations/laws/rules/5500-500.html, Aug. 2, 1996.
Song, A Card That Asks for ID, Time Magazine, Apr. 12, 2004, 1 page.
A Store Card Issuer Looks for Lift from Electronic Gift Certificates, Credit Card News, Feb. 1, 1995, 2 pages.
Claessens, et al., A Tangled World Wide Web of Security Issues, First Monday, retrieved from the internet at http//www.firstmonday.org/issues/issue7_3/claessens, retrieved from the internet on Oct. 6, 2006.
Anonymous, Coca-Cola ATM Money Cards, Retrieved from the Internet at: http:—www.cardweb.com-cardtrak-news-cf4_4a_97.html, Apr. 4, 1997, ACS 012.
AMOCO article; Associates-Corp/AMOCO, Business Wire; Aug. 29, 1985.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
Abstract to 2007 JPMorgan Chase Disaster Response Card National Strategy Plan Abstract, Jan. 26, 2007.
Siegel, Joel G., et. al., Accounting Handbook, Second Edition (1995).
Allen et al., Allen et al., Overview of Smart Cards and the Industry, Smart Cards Seizing Strategic Business Opportunities, Chapter 1, pp. 2-20, Irwin Professional Publishing, 1997.
American Bankers Association, American Bankers Association, The Bank Credit Card Business, 1996.
American Express Incentive Services, Incentive, Sep. 1996, p. 126.
Fickenscher, Amex Prepaid Offering is Latest Card for Firms Regarding Employees, American Banker, vol. 161, No. 151, Aug. 8, 1996, pp. 1-2.

Neumann, an Enhanced Neural Network Technique for Software Risk Analysis, IEEE Transactions on Software Engineering, vol. 28, No. 9, Sep. 1, 2002, pp. 904-912.
The State of Arkansas, Arkansas Code of 1987 Annotated (1999).
Associates First Capital Corporation, Hoover's Inc., The Industry Standard The Newsmagazine of the Internet Economy, thestandard.net/companies/company-display, Apr. 6, 1999.
Anonymous, Association of Inventive Gift Certificate Suppliers, vol. 169, No. 8, Aug. 1, 1995.
Authorization of Financial Agent and Terms of Performance, Debit Card Application for Houston, Texas, Sep. 1991, acs00277412.
E-LOAN, Auto Loan Rates, retrieved from the Internet on Sep. 30, 2008.
Award Card Comparison, JA7922, Nov. 1, 1995.
Plotnick, Jennifer, Bakersfield Calif Investors Explore Buying Rental Property Apr. 11, 2004.
Brehl, Banks issue cash-card pledge, The Toronto Star, Oct. 9, 1997, 1 page.
Block, Valerie, Blockbuster running test of a stored value card, The American Banker, Sep. 1, 1995.
Board of Governors of the Federal Reserve System—Report to the Congress on the Application of the Electronic Fund Transfer Act to Electronic Stored-Value Products, May 1997, acs00098020.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
Business Editors and Real Estate Writers, Business Editors and Real Estate Automotive Writers, Consumers Now Can Know What Loan Rate Offers to Expect Based on Their FICO Credit Score at MyFICO.com, Business Wire, New York, Mar. 6, 2002, p. 1.
CES/NaBANCO introduces stored value card technology blockbuster video is first merchant partner, Business Wire, Inc., Jan. 15, 1996.
Cheney, How Effective Were the Financial Safety Nets in the Aftermath of Katrina, HurricaneKatrina, Jan. 2006.
Card Based Award Systems, JA8309, Nov. 1, 1995.
CardEx Incentives, www.cardex.com, Apr. 6, 1999.
CardFlash, Apr. 5, 2005.
Rosen, Cash Just Isn't Flexible Enough Shops of the Future Will Only Take Cards, Daily Express, Technology Section, Feb. 10, 1995, 1 page.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks A Consultative Approach to Setting Priorities at the Community Level, Public Health Rev 1994, vol. 22, Jun. 16, 2005, pp. 321-337.
Britt, Competing in Auto Lending, America's Community Banker, vol. 5, No. 11, Nov. 1, 1996, pp. 33-37.
Haddad, Charles, et. al., Congratulations, Grads—You're Bankrupt A Marketing Blitz Buries Kids In Plastic And Debt, May 2001.
Consortium created to manage common electronic purse specification, Cardtech Securtech, Chicago, www.visa.com/av/news/PRmisc051199.vhtml, May 11, 1999.
Hight, Jim, Consulting Services, www.strategies-tactics.com, Jan. 24, 1997.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http//www.virtualschool.edu/mon/ElectronicProperty/klamond/credit, printed Jul. 8, 2005, 17 pages.
D.C. Area Safeway Stores Look for Increase in Sales Volumes and Revenue with Cards, Card News, vol. 6, No. 25, Dec. 30, 1991, pp. 7-9.
CARDWEB.COM, Daily Payment Card News, Aug. 10, 2004.
Sherer, Paul M., Deals & Deal Makers Web Ventures Seek To Facilitate Business Credit, Private Equity, Vovember 1999.

Debit Card News—Paperless Trail Leads Debit to a Check-Free Payroll Program, vol. 3, No. 12, Dec. 16, 1997.
Debit Card Services—Invitation for Expressions of Interest, Jul. 1991, acs00277422.
Piskora, Debit Cards Seen Poised for New Markets, American Banker, Credit/Debit/ATMs, Mar. 7, 1995, p. 16.
Debit and Stored Value Cards for Government: A Growing Trend but States Could Do More, A Survey and White paper of The EBT Industry Council, Nov. 2006.
Definition of Store-Value Card, Wikipedia, retrieved from the internet at http//en.wikipedia.org/wiki/Stored-value_card, retrieved from the internet on Apr. 16, 2007.
Direct Payment Card, International EBT Pilot Evaluation Pilot Evaluation—Argentina, Jan. 1996, acs00277456.
Lennox, Graeme, Don't Be Tempted By The Urge To Splurge Zero Rates Sound Great But You'll Pay Dearly In The End, Jul. 22, 2001.
E-Z Pass, Web page, http//www.ezpass.com-Disc_portNewYork.htrnl, Nov. 12, 2001.
E-Z Pass, Web page, hap\\www.ezpass.com-Disc_ny_annual.html, Nov. 12, 2001.
E-Z Pass, Web page, http\\www.ezpass.com-frameMain.html, Nov. 12, 2001.
E-Z Pass, Web page, http\\www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, p. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz . . . The MasterCard Card Ultimate Incentive, Incentive, Oct. 1995, 3 pages.
Foia# 09-02-12 Responsive Records Book #11, Mar. 12, 2009, acs00279715.
Foia # 09-02-12 Responsive Records Book #2, Mar. 12, 2009, acs00277515.
Foia # 09-02-12 Responsive Records Book #3, Mar. 12, 2009, acs00277531.
Foia # 09-02-12 Responsive Records Book #5, Mar. 12, 2009, acs00278229.
Foia # 09-02-12 Responsive Records Book #7, Mar. 12, 2009, acs00278754.
Block, First Data Subsidiary Creates Payroll Card for the Bankless, LexisNexis Academic, Credit/Debit/ATMs, p. 10, Mar. 21, 1997.
First Data markets stored-value cards, Cards International, Jan. 30, 1996, p. 5.
First USA—Activate Today and Get One Hour Free Calling Card Calls, Call 1-800-555-2535, First USA, 6 pages, Oct. 1997.
First USA—Call 1(800)335-2453 To Receive One Free Hour of Domestic Long Distance Calling (No Strings Attached), First USA, 6 pages (1997).
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Norris, First data unit develops blockbuster cash card, Omaha World Hearld Sunrise Edition, Business Section, Jan. 19, 1996, p. 16.
Roberts, Leigh, Fnb And Nedcor Launch Into The New Era of Smart Card Banking Nov. 15, 1998.
E-LOAN, Frequently Asked Questions (2001).
Frequently asked questions, ECARD, www.eregard.com, printed Sep. 23, 2001, 7 pages.
Glossman, et al., Glossman, et al., Citicorp Company Report, Report No. 1647151, p. 8 of 16, May 9, 1987.
Ostroff, Jeff, Guide to Buying New Cars, Used Cars, Dealer Scams, Feb. 2001, p. 1-7.

Hamey, Kenneth, Hamey, Home Asset Management Accounts Link Mortgages Equity Lines [Final Edition], The Washington Post, Oct. 5, 2002.
Hargreaves, The Evaluation of the Expanded EBT Demonstration in Maryland, Final Report, May 1994, acs00092018.
Machlis, Have it the smart way Burger King program drives smart-card use, Computerworld, printed Feb. 23, 2001, 1 page.
Here's the calling convenience you asked for 1-800-call-ATT . . . For All Calls, AT&T, Appendix A for Card Carriers, 7 pages (1999).
Hoovers, General Mills, Inc. Corporate Profile relied upon to show the history of the company, http/cobrands.hoovers.com/global/cobrands/proquest/history.xhtml?COID=10639, Jul. 12, 2005, 2 pages.
How Is It Different?, JA8331, Jul. 2000.
Konrad, IBM Had a Bunch of Unusual Ideas in 2003, www.philly.com, printed Jan. 21, 2004, posted on Jan. 13, 2004, 2 pages.
Incenticard, Bellsouth, JA8329 (2000).
Judy Quinn, Incentive Cards Explained, Incentive, Dec. 1995, 5 pages.
Incentive Firms Find Debit Cards A Rewarding Experience (Off-line debit card issuers converge efforts with companies looking for effective incentives to boost employee productivity and to motivate individuals to buy their products), Debit Card News, Nov. 1997.
Vincent Alonzo, Incentive Marketing . . .Three If by Smart Card, Incentive Sep. 1995, p. 11.
Incentive gift Card Another way to give the gift of choice!, Incentive, Aug. 1995, 2 pages.
Coulton, Incentives Field Moving to Card-Based Series 14, American Banker, Mar. 26, 1998, 3 pages.
Introducing SpendingMoney(™), Armetta Marketing & Design Product Concept Report, Oct. 9, 1996, 15 pages.
Introducing the First USA Platinum Connect Card, First USA Promotional Mailing, Dec. 1997, 2 pages.
Request for Information submitted to Department of Health and Human Services by JPMorgan Electronic Financial Services, Request for Information for EBT Services, Aug. 10, 2006.
Alaska Housing Finance Corporation Quarterly Unaudited Financial Statements with Summarized Financial Information for Jun. 30, 2004, and Request for Information Banking Services, Mar. 31, 2005, Bates Nos. ACS-00000143—ACS-00000231.
Kilian-Kehr, Roger, Kilian-Kehr, Mobile Security with Smartcards, Dissertation, Apr. 8, 2002.
Key Bank Holiday Offer, http//www.key.com/swiftgift/home.html, printed Apr. 5, 1999.
Statement of Brian Kibble-Smith, House Committee on Ways and Means, Apr. 5, 2006.
Kleege, Stephen, Kleege, Visa Unveils CoBranding Offensive (Visa International, Visa U.S.A. Inc.), American Banker, v. 159, n. 43, Mar. 4, 1994 (www.dialogclassic.com/MainFrame.jsp, pp. 1-3).
Lewis, David, Lewis, Mortgage Lending Optimized, IntternetWeek, Issue 858, Apr. 23, 2001.
LexisNexis Academic, Debit Card Innovation, vol. XXXV, No. 5, p. 2, May 1997.
LexisNexis Academic, Debit Cards Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
Power, Denise, Loehmann's Compiles Shopper Data Via Credit Card, vol. 28, No. 3 (1998).
MailFrontier Survey Finds that Consumers Hold Financial Institutions Accountable for Online Identitiy Theft, www.mailfrontier.com, Palo Alto, CS, Nov. 2004.
O'Conner, Maritz Gets MasterCard's Stamp of Approval, Business Travel News, Aug. 19, 1996, 2 pages.
Maritz, Incentive, Jun. 1996, p. 111.
Meridian Award Cards, JA8251, Sep. 16, 1997.
Meridian-the leader in card marketing, JA8343, Sep. 16, 1997.
Meridicard vs. Debit Cards, JA7917, Sep. 16, 1997.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.

Modification # 3 to the Authorization of the Financial Agent and Terms of Performance, Feb. 25, 1995, acs00277500.

Modification # 4 to the Authorization of the Financial Agent and Terms of Performance, Apr. 1, 1996, acs00277507.

More Retailers Turn to Co-Branding, Chain Store Age Executive with Shopping Center Age, Feb. 1, 1995, 3 pages.

Bogle, Mutual Funds at the Millennium Fund Directors and Fund Myths, The Vanguard Group to the '40 Act Institute of PLI (Practicing Law Institute), New York, Ny, May 15, 2000, 15 pages.

NCNB article; NCNB to become biggest bank in visa debit card program; The American Banker; Mar. 8, 1979.

New 1-800-Call-ATT Campaign Promotes One Number for All Calls, AT&T Marketing, News Release, www.att.com/press/0297/970217.csa.htm, Feb. 17, 1997, 2 pages.

Schwab, Charles, Now 7 Ways for a better Total Return for Your Money Schwat 1, the Inventor's Asset Management Account, Charles R. Schwab, Charles Schwab & Co., Inc., 16 pages.

Paper or Plastic? With these three incentives, The Choice is Yours, Incentive, Feb. 1996, 2 pages.

Feldman, Judy, Pay by Check Over the Phone or Net, Oct. 1999.

Dugas, Payroll May Ask Paper or Plastic?, USA Today, 3B, Aug. 14, 2001, 1 page.

Youll, James, Peer to Peer Transactions in Agent Mediated Electronic Commerce, Aug. 2001.

Wolf, Harold a., Personal Finance, Sixth Edition, (1981).

Proton world and Europay to co-operate in creation of new CEPS-compliant e-purse application, Press Release 1999, Waterloo, Belgium, Jun. 28, 1999, 2 pages.

Brown et al., Purchasing Card Magic Eli Lilly Finds Accounts Payable Flying High With Plastic, Corporate Cashflow, vol. 15, No. 12, Nov. 1994, 2 pages.

Purse Application for Cross Border Use in Euro, Cordis, Pace 1st 1999-11531 Pace, www.cordis.lu, printed Feb. 23, 2001, 3 pages.

Quinn, Jane Bryan; for many college youths, credit cards east to get; American Express article; St. Louise Post-Dispatch; Feb. 3, 1989.

SK100 Smart Card Electronic Purse Balance Reader, SK100 Balance Reader, http//perso.wanadoo.fr, printed Feb. 23, 2001, 1 page.

Miller, Section E.2.1 Kerberos Authentication and Authorization System, Project Athena, Cambridge, MA, Dec. 21, 1987, 39 pages.

Sessums, Unbanked Citizens Draw Government Attention, vol. 9, No. 4, (1997) acs00280762.

Souccar, Smart Cards 1st Union Smart Card Pilot Enlists a Second Army Base, American Banker, Digital Frontiers, vol. 164, No. 61, Mar. 31, 1999, 3 pages.

Smart Cards Big Brother's Little Helpers, The Privacy Committee of New South Wales, No. 66, Aug. 1995.

NONE, Smart Cards Forging Into Credit Card Market, vol. 1995, Issue 6.

Smart card for loyalty and e-purse applications eclipses capability of conventional mag-stripe cards, Press Release, www.1.sib.com, Apr. 21, 1997, printed Feb. 23, 2001, 3 pages.

SmartAxis Load Cash on to your E-Purse Card, Supported Currencies and Schemes, www.smartaxis.co.uk, printed Feb. 23, 2001, 9 pages.

Spurgin, Sopininmon! or What's Happening in the Retail Credit Card Environment, Credit World Journal, vol. 85, No. 4, Mar. 1, 1997, pp. 20-23.

Lacker, Stored Value Cards Costly Private Substitutions for Government Currency, Economic Quarterly, 1996, Economic Quarterly, v82, n3, p1(25), ISSN 1069-7225, 17 pages.

Lazarony, Stuck for a gift? Give a prepaid credit card, www.bankrate.com, Dec. 21, 1998, 1 page.

Rossman, Kenneth, Summary Appraisal of Real Property (2002).

Key, Swift Gift 'Wows' Internet Shoppers, PR Newswire, www.key.com/swiftgift/home.html, Dec. 2, 1998, 1 page.

The Campus Card Conundrum, Card Technology, Journal ISSN 1093-1279, p. 25+, Feb. 1998, pp. 1-8.

Electronic Purse Reaches the Car Park, http \ \docs.vircom.net/mobility/parking, printed Feb. 23, 2001, 2 pages.

The Evolution of a New Consumerism, Chain Store Age, vol. 73, Jun. 1997, pp. 8-9.

The Federal Transit Administration, TCRP Report 32 Multipurpose Transit Payment Media, Chapter 2 Multipurpose Fare Payment Overview, p. 10-20.

Stoughton, The Gift of Credit, www.washingtonpost.com/wp-srv/business, Dec. 14, 1998.

Nilson, H. Spencer, The Nilson Report, Nov. 1998.

Nora Wood, the Power of the Card, Incentive, Jul. 1997, 6 pages.

Stuber, The electronic purse an overview of recent development and issues, Bank of Canada, Technical Report No. 74, www.bankofcanada.ca, Jan. 1996, printed Feb. 23, 2001, 2 pages.

Anonymous, Two Chips Can Be Better Than One May 2001.

Understanding the benefits Smartcity offers a number of important benefits to both the card issuers and their customers, http//www.icl.com/smartcards/benefits.htm, printed Feb. 27, 2001, 2 pages.

Langheinrich et al., Unintrusive Customization Techniques for Web Advertising, Computer Networks, vol. 31, 1999, pp. 1259-1272.

Universal Card free lifetime membership extended 3 months, AT&T Marketing, www.att.com/press/0297/970217.csa.html, Dec. 4, 1990, 2 pages.

Unknown, Unknown, Thai Smart Card to Expand Abroad (Smart Loyalty's Smart Bonus Program has 300,000 Cardholders in Thailand, the company plans to expand into markets that include Australia and Malaysia), Cards International, n. 183 p. 5, Sep. 22, 1997.

Yee, Bennet, Using Secure Coprocessors, May 1994.

Vivo Tech, ViVOtech, Inc. RF-Based Contactless Payment: a more convenient way to pay, White Paper—Version 2.0, Apr. 2004.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International and SERMEPA Announce Plans for Cross Border Visa Cash Based on CEPS, www.visa.com/av/news/praaamisc111699.yhtml, Nov. 16, 1999.

Visa first to launch electronic purse load via GSM mobile phone, www.cellular.co.za, Johannesburg, ZA, printed Feb. 23, 2001, 4 pages.

Visa releases visa cash electronic purse specifications based on CEPS, www.visa.com/av/news/PRaamisc042099.vhtml, San Francisco, Apr. 20, 1999.

Hansell, Visa to unveil electronic purse cards, New York Times, printed Feb. 23, 2001, 2 pages.

Ward, Getahn; New Debit Card is Introduced to Serve Unbanked Workers; Jun. 23, 1999; News & Business.

Wood, John et. al., Wood, et al., Electronic Transfer of Government Benefits, Federal Reserve Bulletin, pp. 203-217, Apr. 1997.

Welcome to Card Express CardEx, CardEx website archived by web.archive on Oct. 31, 1996, http//web.archive.org/web/*/http//www.cardex.com, retrieve Oct. 18, 2003, 7 pages.

Welcome to Card Express, The CardEx Incentive Card, as disclosed in the CardEx web site archived by web.archive.org on Feb. 7, 1998, http//web.archive.org/web/*/http//www.cardex.com, retrieve Oct. 18, 2003, 8 pages.

Swiftgift, Welcome to Swiftgift, www.swiftgiftcard.com, Dec. 8, 1998, 10 pages.

Bowen, Cathy, Welfare Agencies Seek Aid From Smart Cards, p. 74, Oct. 2002.

Wells Fargo Blazes New Trail for Homeowners, Oct. 2002.

Wenninger et al., The Electronic Purse, Current Issues in Economics and Finance, vol. 1, No. 1, Apr. 1995, acs00098037.

Kenneth Hein, What's the Deal?, Incentive, Jul. 1998, 7 pages.

Machilis et al., Will smart cards replace ATMS?, Computerworld, printed Feb. 23, 2001, 3 pages.

* cited by examiner

Dear Ms. Jones,

We are pleased to announce that you may qualify for our new Bank One Magnesium Credit Card.

The Bank One Magnesium Card gives you an unsurpassed savings opportunity with an introductory 0% fixed APR on all purchases and balance transfers for up to six months. After the introductory period, you will continue to save with a fixed rate as low as 8.9% APR on purchases and balance transfers. And there is no annual fee.

The terms of your account, including the APRs, are subject to change in accordance with your Cardmember Agreement.

Please fill out the enclosed application and return it to us.

Thanks,
The Bank One Team

Super-Low Introductory APR: 0.0%!!!  — 31

32

Bank One Magnesium Card Credit Application

Fill out this application and return it to us:

Name: _____
Address: _____
Social Security Number: _____
Annual Income: _____
Do you own a house? Circle one: (Yes, No)
Monthly Rental or Mortgage Payment: _____
Are you married? Circle one: (Yes, No)
If married, spouse's income: _____
If married, number of children: _____

33

RATE, FEE AND OTHER COST INFORMATION

Annual Percentage Rate (APR) for purchases: A 0% fixed APR until the first day of the billing cycle that includes September 1, 2003. After that, 8.9% fixed, 10.9% fixed, or 12.9% fixed, depending on our review of your application and credit history.

34

SYSTEM AND METHOD FOR OFFERING RISK-BASED INTEREST RATES IN A CREDIT INSTUTMENT

This application is a Divisional of U.S. patent application Ser. No. 10/448,230, filed on May 30, 2003, entitled "System and Method for Offering Risk-Based Interest Rates in a Credit Instrument." The disclosure of this priority application is hereby incorporated by reference in its entirety.

FIELD OF THE INVENTION

The present invention relates generally to the field of credit instruments. More specifically, it relates to a system and method for providing credit instruments by offering consumers a credit instrument with a plurality of potential interest rates corresponding to a plurality of consumer credit risk scores.

RELATED APPLICATIONS

This application is related to subject matter in Ser. No. 10/284,394, filed Oct. 31, 2002, entitled "System And Method For Account Registration With User Selectable Terms".

BACKGROUND OF THE INVENTION

Credit accounts are widely used throughout the world for non-cash payments for goods and services. Typically, the authorized user of an account is issued a card and account number that can be used to charge purchases to his account. The credit card issuer (e.g., a bank) pays the merchant, and the card holder then reimburses the issuer. The issuer's revenues are received by charging the merchant a fee for each transaction, and also by charging the cardholder periodic fees and interest on unpaid balances.

From the cardholder's perspective, using credit cards is desirable for several reasons. It is often more convenient than paying with cash or checks. The customer receives an itemized record of payments every month from the issuer, thereby enabling consumers to better track expenses and plan budgets. Further, the consumer can use a credit card to borrow money when personal funds are low.

From the issuer's perspective, issuing credit cards can be a very profitable business. A good customer can generate hundreds of dollars of revenue per year through merchant fees, cardholder fees, and cardholder interest payments. However, issuers can also incur substantial losses from customers who fail to pay cardholder fees, cardholder interest payments, and account balances. As a result, issuers want to acquire as many good (i.e., low risk) customers as possible while avoiding undesirable (i.e., high risk) customers. The primary factor used by issuers to determine whether an applicant is likely to be a good customer is a "credit risk score."

Credit risk scores can be any score that measures a person's credit risk and can be FICO scores or any other proprietary or non-proprietary credit risk score. Issuers such as Bank One typically calculate a credit risk score based on information submitted in an applicant's credit card application in addition to a credit history report provided by a third party rating agency such as Equifax, Transunion, or Experion. Although third party rating agencies calculate and provide a score called a "credit rating" as part of the credit history report, such scores are typically not used by issuers except for purposes of denying applications of applicants with prohibitively low scores.

As a general rule, issuers consider applicants with a higher (better, more desirable) credit risk score to have a lower (worse) risk of defaulting on payments to the issuer. Similarly, issuers consider applicants with a lower credit rating to have a higher risk of default. Because issuers lose money when customers default, issuers seek applicants with the highest credit risk scores possible. As a result of these considerations, applicants with higher credit risk scores are considered more profitable and desirable to issuers. As with bank loans, customers with lower credit risk scores are ultimately charged higher interest rates to account for their higher risk, and customers with higher credit risk scores can be charged lower interest rates because of their diminished risk. Thus, consumers with good credit histories and resulting high credit risk scores are highly desired by issuers, and issuers must vigorously compete to attract and retain such customers. On the other hand, an issuer will often deny a credit card application of an applicant who has a credit risk score below a level that is acceptable to that issuer for a particular credit card product.

Issuers also want to attract new customers in the hopes of generating additional revenue. Issuers have traditionally tried to attract new customers by advertising in banks and places of business, and also by sending offers to potential customers by mail and other means. The terms (or parameters) of these offers vary. For example, many credit card solicitations offer different combinations of interest rates, credit limits, and annual fees. Many also offer the customer a low introductory interest rate. Others promise rewards for card usage such as rebates on products (e.g., GENERAL MOTORS), cash rebates (e.g., DISCOVER), or frequent flyer miles (e.g., AMERICAN AIRLINES/CITIBANK).

Credit cards often have a lower introductory interest rate to entice applicants. However, after a fixed period of time, such as six months, the interest rate of the card usually goes to a higher long-term rate. The long-term rate is called the "go-to rate" because it is the level the interest rate "goes to" after the introductory time period. Issuers also use the applicant's credit risk score to determine adjustments in the customer's long-term interest rate for the credit account. In this way, a particular cardholder's go-to rate can more closely reflect the cardholder's risk to the issuer.

Until now, issuers have typically relied on a relatively limited range of product differentiation (as discussed above) in combination with traditional advertising to distinguish their products from competitors' offerings. The conventional credit product offer has been for a single product with a single set of term parameters, e.g., a VISA card at a 14% annual percentage rate (APR). Conventional credit product offers have not tried to attract new customers by offering a plurality of term parameters corresponding to a plurality of credit risk scores in the communication of the initial offer, thereby enticing individuals with high credit ratings to apply for a credit card, and thereby distinguishing their product from the competition.

In addition to the problems faced by the issuers, consumers (i.e., the cardholders) face a separate set of problems. Consumers with good credit histories often receive numerous offerings to sign up for new credit cards. While applicants are of course free to seek out an account with terms they desire, consumers are typically faced with advertised interest rates that apply to all applicants generally. Although it may be cost-justified for a card issuer to provide a credit instrument with a very low interest rate to consumers with excellent credit histories, the number and availability of such offers is somewhat diminished since each offered credit instrument provides a single interest rate applicable to all accepted applicants. The result is that applicants with excellent credit histories are often "over-qualified" for the interest rates offered on a particular credit instrument. Such applicants often do not achieve the lowest possible interest rates that would be cost-justified by their credit histories. Also, because card issuers tend to market their product offerings in an over-inclusive manner that does not provide these "high end" consumers with the best possible terms (rates), card issuers may miss opportunities to attract these favored consumers who may not otherwise respond to offers in the first place.

Similarly, applicants with poor credit histories are often under-qualified for an offered credit instrument. The expected costs associated with providing such applicants a particular credit instrument would require a higher interest rate than the single interest rate typically offered for the credit instrument. This puts such applicants at a disadvantage in acquiring credit instruments such as credit cards, and it also denies revenue to card issuers who would be willing to provide the credit instrument to such applicants, but at a higher interest rate.

Other problems and drawbacks also exist.

SUMMARY OF THE INVENTION

Accordingly, some or all of the deficiencies outlined above are overcome by providing in one exemplary embodiment a method for communicating a multi-tiered offer to apply for a credit instrument, comprising: processing credit history data; calculating a first plurality of interest rates based on the credit history data; determining a second plurality of interest rates based on the first plurality of interest rates, the second plurality of interest rates corresponding to a plurality of credit risk scores; and communicating the offer to apply for a credit instrument in an initial communication with an offeree, the offer disclosing the second plurality of interest rates.

According to another aspect of the invention, a method is provided for communicating an offer to apply for a credit instrument, comprising: determining a first plurality of interest rates corresponding to a first plurality of credit risk scores; communicating an offer to apply for a credit instrument to an offeree, the offer disclosing the first plurality of interest rates; receiving a reply from the offeree; determining a credit risk score specific to the offeree; selecting one of the first plurality of interest rates based on the specific credit risk score; and providing the credit instrument to the offeree, wherein the credit instrument is associated with the selected interest rate.

According to another aspect of the invention, a system is provided for communicating an offer to apply for a credit instrument comprising: processing credit history data; calculating a first plurality of interest rates based on the credit history data; determining a second plurality of interest rates based on the first plurality of interest rates, the second plurality of interest rates corresponding to a plurality of credit risk scores; and communicating the offer to apply for a credit instrument in an initial communication with an offeree, the offer disclosing the second plurality of interest rates.

According to another aspect of the invention, a computer-readable medium encoded with computer program code is provided to generate interest rates corresponding to credit risk scores, the program code effective to process credit history data and calculate a first plurality of interest rates based on the credit history data, the first plurality of interest rates corresponding to a first plurality of credit risk scores, the first plurality of interest rates to be used in determining a second plurality of interest rates corresponding to a second plurality of credit risk scores, the second plurality of interest rates to be disclosed in an initial communication with an offeree comprising an offer to apply for a credit instrument.

According to another aspect of the invention, a method of communicating an offer to apply for a credit instrument is provided, wherein the method comprises: processing credit history data; calculating a plurality of interest rates based on the credit history data, the plurality of interest rates corresponding to a plurality of credit risk scores; and communicating an offer to apply for a credit instrument in an initial communication with an offeree, the offer disclosing the plurality of interest rates.

It is one object of the present invention to achieve a competitive advantage for card issuers by providing a credit card offer with a plurality of possible interest rates to consumers.

It is another object of the present invention to achieve a lower interest rate for some consumers by offering a plurality of possible interest rates in a credit instrument, so that accepting consumers with high credit risk scores can achieve a lower long-term interest rate than they would otherwise achieve with a similar credit instrument offering a single interest rate to all consumers.

It is another object of the present invention to offer a broader range of credit instruments to consumers with below average credit risk scores by allowing such consumers to acquire credit instruments offered to consumers with high credit ratings, albeit with a higher interest rate.

It is another object of the present invention to offer a credit instrument that achieves a higher response rate among consumers with high credit risk scores (positive select).

It is another object of the present invention to offer a credit instrument that achieves a relatively lower response rate among consumers with low credit risk scores (negative deselect).

It is another object of the present invention to provide a method for offering consumers a credit instrument with a plurality of possible interest rates corresponding to a plurality of credit risk scores.

It is another object of the present invention to provide a data processing system that can determine a plurality of interest rates to be used in an offer to consumers and achieve one or more the above objects.

The accompanying drawings are included to provide a further understanding of the invention and are incorporated in and constitute part of this specification, illustrate several embodiments of the invention and, together with the description, serve to explain the principles of the invention. It will become apparent from the drawings and detailed description that other objects, advantages and benefits of the invention also exist.

Additional features and advantages of the invention will be set forth in the description that follows, and in part will be apparent from the description, or may be learned by practice of the invention. The objectives and other advantages of the invention will be realized and attained by the system and methods, particularly pointed out in the written description and claims hereof as well as the appended drawings.

BRIEF DESCRIPTION OF THE DRAWINGS

The purpose and advantages of the present invention will be apparent to those of skill in the art from the following detailed description in conjunction with the appended drawings in which like reference characters are used to indicate like elements, and in which:

FIG. 3 is a block diagram according to an embodiment of the invention illustrating a sample offer communication according to one embodiment of the invention.

DETAILED DESCRIPTION OF THE INVENTION

As discussed in the Summary of the Invention, the present invention is directed to a system and method for a communicating an offer to apply for a credit instrument wherein the offer discloses a plurality of potential interest rates corresponding to a plurality of consumer credit scores. While the embodiment of this "multi-tiered" approach to credit offers focuses on interest rates (e.g., long-term APRs) as the variable it should readily be appreciated that the tiering based on other offer parameters (e.g., introductory balance transfer rates, credit limits, annual fees, and rewards and rebates) is within the spirit and scope of the present invention.

Figure 1:
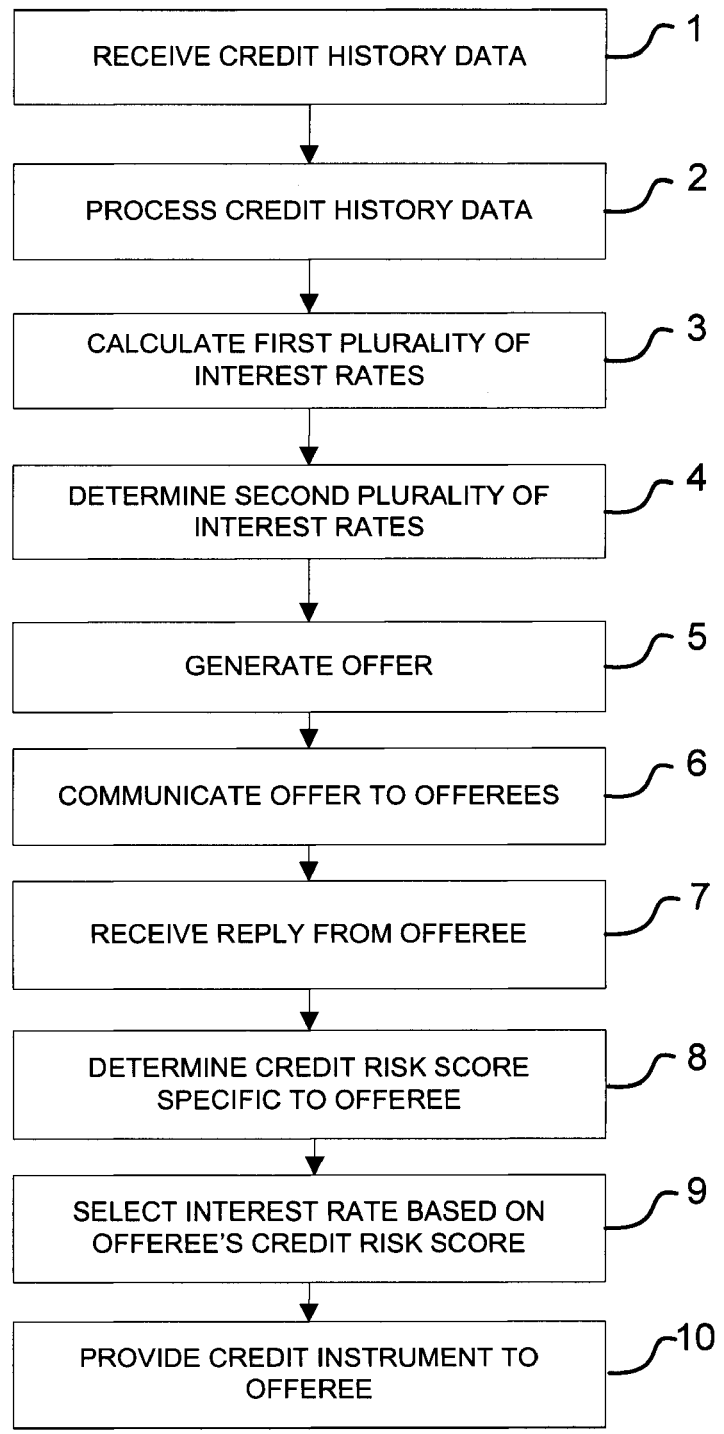
FIG. 1 is a flow chart illustrating a method of communicating an offer to apply for a credit instrument according to an embodiment of the invention.

FIG. 1 is a flow chart illustrating a method of communicating an offer to apply for a credit instrument according to an embodiment of the invention. In step 1, credit history data is received. Credit history data may comprise information from a credit history report provided by a third party rating agency such as Equifax, Transunion, or Experion, or the like, or provided internally by the issuer. Such data may also comprise any data relating to credit histories either on an individual or an aggregate basis. The specific data of the credit histories may comprise individual or aggregated FICO scores, purchasing data, internally derived custom proprietary risk scores, income data, payment history data, other external or data or scores, or other data relevant to the credit history of an individual or group. The credit history data may be received at any kind of data processing apparatus, such as a processor, database, server, computer system, or other processing system. The data may be received or loaded at the prompt or instructions of a software program, preferably a program loaded at the data processing apparatus.

Figure 5:
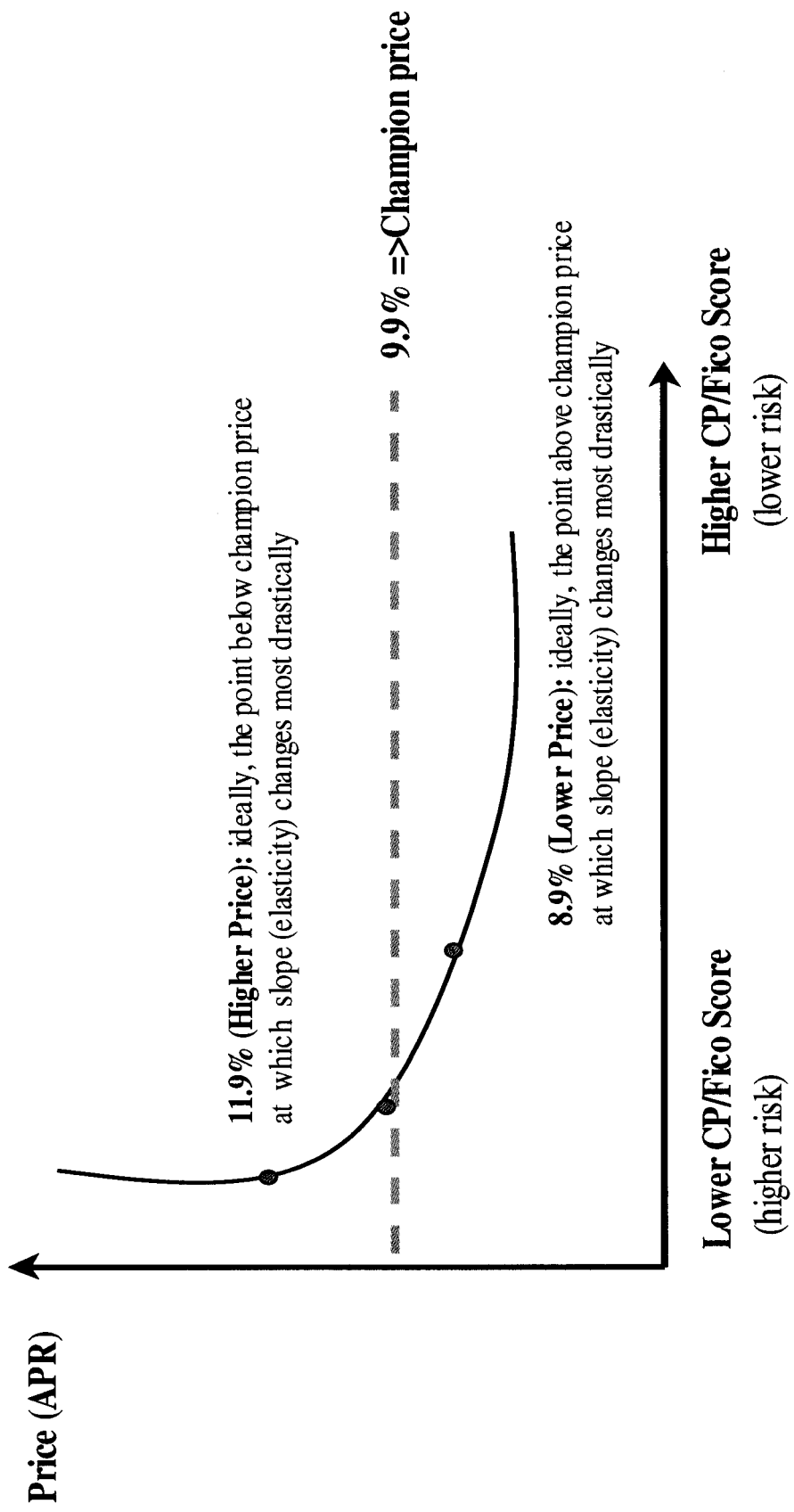
FIG. 5 is a graph illustrating a risk-based continuous pricing function for determining a plurality of interest rates corresponding to a plurality of credit risk scores in accordance with yet another aspect of the invention.

In step 2, the credit history data is processed at the data processing apparatus. This step may comprise processing data in accordance with instructions from a software program loaded at the data processing apparatus. The processing of the data may also comprise the calculation of credit risk scores based on the received data, and this calculation may occur in accordance with an algorithm or program loaded at the data processing apparatus. In step 3, a first plurality of interest rates is calculated. In a preferred embodiment, these interest rates are calculated to correspond to a plurality of credit risk scores. The pluralities could be any number of interest rates and credit risk scores, such as three, five, ten or even a continuous function of interest rates corresponding to credit risk scores across an entire risk spectrum, an example of which is shown in FIG. 5.

In step 4, a second plurality of interest rates is determined. Preferably, this second plurality is based on, or identical to, the interest rates calculated in step 3 (or nearly identical to the rates, considering rounding errors and the like). For instance, the first plurality of generated interest rates could be 7.3257%, 8.213%, 9.1112%, 10.8994%, and 11.21%, and the second plurality could be 8.2%, 9.1%, and 10.9%, which is based on and closely related to a subset of the first plurality. This step could be accomplished by a person or computer such as the processor of step 3. The second plurality of interest rates are the interest rates to be used in an offer of a credit instrument, although the first plurality may be used instead.

In step 5, an offer is generated. Again, the offer could be generated by any kind of processor or human. The offer is based on the second plurality of interest rates. In a preferred embodiment, the offer discloses the second plurality of interest rates, and the second plurality of interest rates is disclosed as a variety of interest rates that may be available to the offeree depending on the offeree's credit history and/or credit risk score and/or CP or FICO score. For instance, the second plurality of interest rates may comprise 8.9%, 9.9%, and 11.9%, which corresponds to a very good credit risk score, a good credit risk score, and a satisfactory credit risk score, respectively. An example of such an offer is the offer shown in FIG. 3. The offer may comprise an offer for a credit card, a debit card, loan, or any other credit or loan product that potentially has one or more associated interest rates. Generating the offer may comprise printing or otherwise outputting a written letter, email, webpage, or other means of communication that contains the offer. In a preferred embodiment, the offer is generated by a computer containing software instructions to insert the second plurality of interest rates into a written communication such as an offer for a credit card, as well known in the art.

In step 6, the offer is communicated to offerees. The offeree can be any person or business association. The offer may be communicated by a written or printed letter, an email, webpage, or other electronic communication, a telephone call, or other means of communication. Preferably, the offer is a letter that is mailed or emailed to a consumer.

The offerees then receive the communication, and some of the offerees reply to the offer. In step 7, the reply is received. Preferably, the reply includes a credit card application that comprises the offeree's social security number and other personal information. The reply may be received at a receiving center, which can be a communication center, as well known in the art.

In step 8, a credit risk score specific to the responding offeree is determined. In a preferred embodiment, the credit risk score is calculated according to a proprietary formula based on a credit card applicant's reply application and/or the applicant's credit report, which can be obtained from a third party rating agency. However, the credit risk score may also be based on any financial information specific to the applicant, including the applicant's income, homeownership status, job and income history, or other personal information, or the applicant's present relationship with the bank. The credit risk score may be any numerical score, as well known in the art. For instance, the credit risk score may range from 1 to 850, where any score over 750 represents a superior credit history and a low risk of default, and any score below 350 represents a poor credit history and a high risk of default.

In step 9, an interest rate is selected based on the applicant's credit risk score. Preferably, the credit risk scores are correlated to the second plurality of interest rates in tiers in such a way that the interest rates offered correspond to a set of credit risk scores. For example, the lowest credit risk score in each group may determine a cutoff for qualifying for a particular interest rate. For instance, if an interest rate of 8.9% correlates to a very good credit risk score of 750, and an interest rate of 9.9% correlates to a good credit risk score of 600, and an interest rate of 11.9% correlates to a satisfactory credit risk score of 400, then an applicant's credit risk score must be at least 400, 600, or 750 in order to qualify for the 11.9%, 9.9%, and 8.9% interest rates, respectively. However, an applicant's credit risk score (or other characteristic) may be such that the issuer denies the applicant's application and/or otherwise decides not to provide a credit instrument to the applicant.

This may be due to credit risk score, potential fraud, overextended credit line, macroeconomic issues, laws and regulations, other business or economic factors, or other factors.

In step 10, a credit instrument is provided to the applicant. The credit instrument may take the form of an approval notification including a card. In a preferred embodiment, a card issuer will provide a credit card to the applicant with a go-to rate equal to the lowest interest rate for which the applicant is qualified, based on the applicant's credit risk score. The credit instrument can be provided to the offeree by any means as well known in the art, including mailing the credit instrument to the offeree and enabling the offeree to activate the card via computer or phone. In one embodiment, the applicants can be processed through a credit card processing center as well-known in the art.

It should be appreciated that the first and second plurality of interest rates could be three interest rates, five interest rates, or even a continuum of interest rates for the entire risk spectrum. A non-linear pricing function, such as the function shown in FIG. 5, can allow for a specific interest rate to be provided to an applicant with a particular credit risk score. (Those of skill in the art will recognize that the pricing function is not necessarily non-linear, but could be a linear pricing function.)

Figure 2:
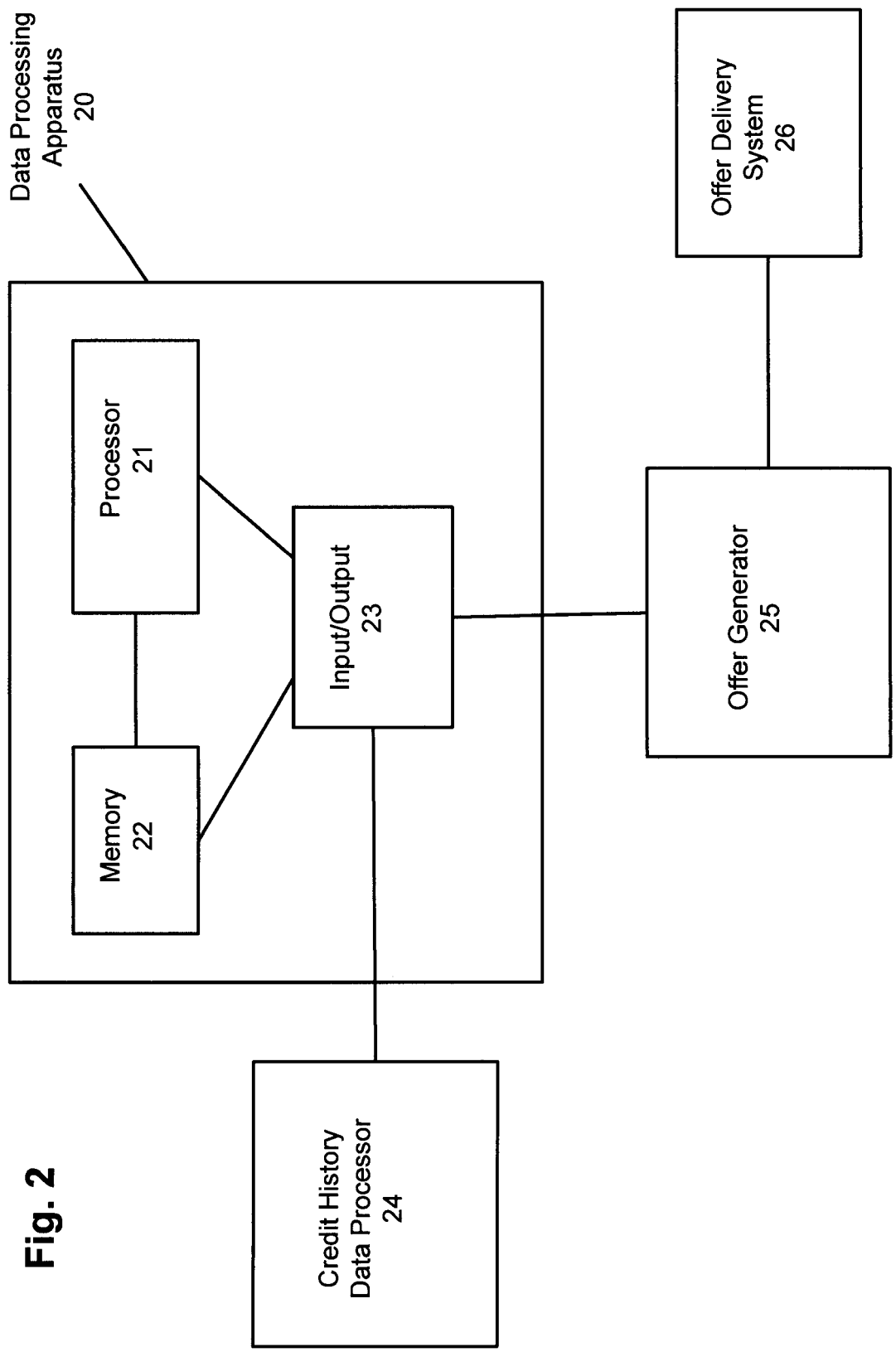
FIG. 2 is a block diagram of a system for generating and outputting a plurality of interest rates corresponding to a plurality of credit risk scores according to an embodiment of the invention.

FIG. 2 is a block diagram showing a system for generating and outputting a plurality of interest rates corresponding to a plurality of credit risk scores according to an embodiment of the invention. As discussed above, the plurality of interest rates can be a continuum, or can be several (three, five, seven, etc.) discrete rates. The system comprises a credit history data processor 24, an offer generator 25, an offer delivery system 26, and a data processing apparatus 20.

According to one embodiment, data processing apparatus 20 comprises a processor 21, a memory 22, and an input/output apparatus 23. The memory 22, processor 21, and input/output 23 operatively connect to one another to enable transmitting and receiving data between and among them. The processor 21 processes data it receives from the memory 22 and the input/output device 23, and the memory stores and passes information received from the processor 21 and the input/output device 23. The processor 21 can also pass data to the memory 22.

The credit history data processor 24 processes credit history data of individuals and/or groups of individuals. The data processing apparatus 20 is operatively connected through its input/output 23 to credit history data processor 24 for receiving processed credit history data and also for transmitting requests to the credit history data processor 24 for processed credit history data. The offer generator 25 receives information from the input/output apparatus 23 and generates an offer based on the data. The offer generator 25 passes the offer to an offer delivery system 26 for delivering offers to offerees.

FIG. 3 is a block diagram according to an embodiment of the invention illustrating a sample offer communication according to one aspect of the invention. The offer of FIG. 3 could be an offer generated according to FIGS. 1 and 2. Element 31 shows that the offer may comprise an introductory APR 31 that is different from the plurality of interest rates that comprise the offered go-to rate. Element 32 shows that the offer may comprise a regular letter offering a consumer to apply for a credit instrument. In one embodiment, the offer letter includes the lowest of the plurality of offered go-to interest rates, such as 8.9%. The lowest of the plurality of rates may be lower than the current market interest rate for the credit product, such as for conventional credit products that advertise a single rate that applies to all applicants. The offer may also comprise a credit instrument application 33, which can be completed by the applicant and returned to the offeror, as well known in the art. The application may comprise a request for the applicant to submit a name and social security information, in addition to other personal information.

Finally, element 34 shows that the offer may disclose a plurality of interest rates that may be available to the applicant based on the applicant's credit history or other credit-relevant information. In a preferred embodiment, a particular interest rate among a plurality of disclosed interest rates is selected for a qualifying applicant based on the issuer's review of the applicant's credit history.

In one embodiment of the invention, the plurality of interest rates is a continuum of interest rates (i.e., a curve), and a discrete plurality of interest rates may not be disclosed in the offer. Instead, a range of interest rates could be disclosed, or a part of the range could be disclosed such as the minimum or maximum interest rate available to applicants based on their credit profile. In this way, an interest rate specific to the applicant's credit risk score can be selected for the applicant instead of selecting from a smaller set of interest rates that correspond to a range of credit risk scores.

Figure 4:
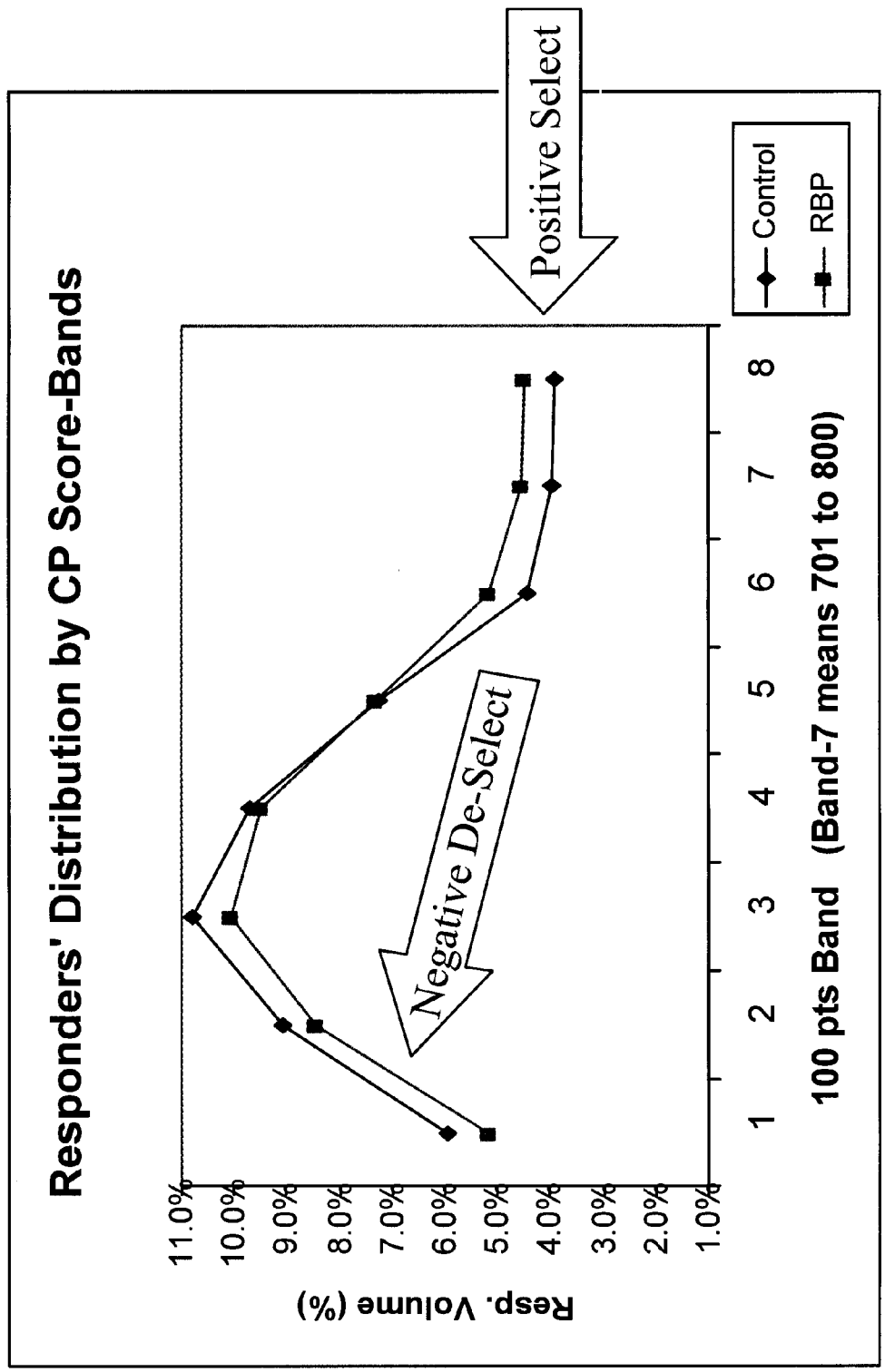
FIG. 4 is a graph illustrating the advantageous features of positive select and negative deselect according to an embodiment of the invention.

FIG. 4 is a graph illustrating the advantageous features of positive select and negative deselect achieved by one embodiment of the invention. The graph shows the response rates of applicants in various credit score bands when the applicants received two different types of credit instrument offers. The control group received a traditional credit instrument application that disclosed a single go-to interest rate available to all applicants. The risk-based pricing (RBP) group received an offer disclosing a plurality of interest rates according to the present invention, such as the invention described in FIGS. 1-3. In this particular example of FIG. 4, the RBP group received an offer which disclosed three possible go-to interest rates that could be available to applicants depending on a review of their credit histories, wherein the middle interest rate was identical to the go-to rate disclosed for the control group. The middle interest rate could be the current market interest rate, also called the Champion price.

The diagram of FIG. 4 shows the credit risk score profile of the applicants who responded to the offer in the RBP and control groups. It tracks the percentage of the total response volume (y-axis) for RBP and control groups versus the credit risk score band (x-axis) of those applicants. The diagram shows a higher response volume from higher/better credit risk scores in the RBP group as compared to the control group (positive select), and a lower response volume from the low/poor credit risk score applicants in the RBP group as compared to the control group (negative deselect).

For instance, negative deselect can be seen from the fact that while approximately 6.0% of the applicants in the control group had a very low/poor credit risk score between 101 and 200 (band one), only approximately 5.2% (a smaller percentage) of the applicants in the control group had a low/poor score in band one. Positive select can be seen from the fact that while 4.5% of the control applicants had a credit risk score in band 6 (a higher/better score), approximately 5.2% of the RBP group had such scores. Thus, the RBP offer attracts more high-scoring people (positive select) and fewer low-scoring applicants (negative deselect) than the control offer. In this way, an embodiment of the present invention allows issuers of credit instruments to attract and retain a higher proportion of desirable customers and a lower proportion of less-desirable customers, thereby increasing the issuer's profitablility through higher revenues from more desirable (low-risk) consumers and reduced costs from less desirable (high-risk) consumers. Another related benefit may be reduced processing costs for applications that would otherwise be received from the low/poor credit risk score applicants who do not qualify for the particular credit instrument.

One implementation of the invention shows yet another advantage of the present invention. In this embodiment, the gross response rate for the control group was 0.55% while the gross response rate for the RBP group was 0.62%. Thus, the RBP group achieved a 13% increase in gross response rate over the control group. The RBP offer was thereby more successful in attracting new customers, illustrating one advantage of the invention.

On the other hand, an offer according to another embodiment of the invention may attract more applications from each risk group, including the low/poor credit risk score consumers, by disclosing parameters appropriate for each consumer risk segment. For instance, high-risk consumers who have a history of credit application rejections from cards offering a single rate may feel more likely to get approved for a card with a higher disclosed rate, and they may therefore be encouraged to pursue an offer that discloses a higher and therefore more realistic rate.

FIG. 5 is a graph illustrating a risk-based continuous pricing function for determining a plurality of interest rates corresponding to a plurality of credit risk scores in accordance with yet another aspect of the invention. The diagram shows the relationship between the interest rate (y-axis) and credit risk score (x-axis) in a continuous function or algorithm that correlates or otherwise relates interest rates to credit risk scores. Such a function could be implemented by software and employed by a processor to generate the plurality of first or second interest rates and corresponding pluralities of credit risk scores, in accordance with FIGS. 1-3. The function or algorithm could also be used to generate or derive discrete values, as shown at the 8.9%, 9.9%, and 11.9% marks. Here, the interest rate is also called the annual percentage rate (APR) or the price, since it is essentially the percentage price that cardholders must pay to the issuers for the use of the issuer's credit instrument. For purposes of this example, 9.9% is the current market price, which is also called the Champion price. The credit risk score could be generated by any method of measuring an applicant's risk profile or creditworthiness, such as a CP or FICO score, or any proprietary model.

The diagram of FIG. 5 shows that, as discussed above, applicants with low/poor credit risk scores are correlated to a higher interest rate to justify their higher risk to issuers, while applicants with higher credit risk scores are correlated to lower interest rates because of their lower risk. The exact shape of the function will depend on the exact algorithm or function used by an issuer of a credit instrument as well as the exact credit history data and current market interest rate used to calculate the function. Thus, the shape of the function could change daily as the credit history data changes, even though the algorithm may stay the same. Preferably, the plurality of credit risk scores and interest rates used by the issuer in the offer will correspond to points on the graph. For instance, in keeping with the example of FIG. 1, the 8.9%, 9.9%, and 11.9% interest rates may correspond to credit risk scores of 750, 600, and 400, respectively. If a different function were used, the same interest rates might correspond to different credit risk scores of, e.g., 725, 510, and 330, respectively.

It should be appreciated that while the pluralities of interest rates corresponding to credit risk scores should be points on the graphed function (or at least based on the graph), the actual choices of points would need to be selected for the offer. While three selections were made in FIG. 5 at 8.9%, 9.9%, and 11.9%, the selections could have been made at 5%, 6.5%, 7.8%, 9.25%, 10.5%, and 13%, or any other plurality of interest rate selections.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

What is claimed is:

1. A data processing apparatus for communicating a multi-tiered offer to apply for a credit instrument, comprising:
   a processor;
   a memory operatively connected to said processor, said memory containing a program adapted to be executed by said processor, said program being configured to execute a method comprising:
      processing credit history data;
      determining a first plurality of interest rates based on said credit history data using a continuous function or algorithm wherein the first plurality of interest rates is based at least in part on credit risk scores derived from said credit history data; and
      determining a second plurality of interest rates based on said first plurality of interest rates using a second continuous function or algorithm, said second plurality of interest rates corresponding to a plurality of credit risk scores based at least in part on said credit history data comprising a spectrum of credit risk scores; and
   an input/output apparatus, operatively connected to at least one of said memory and said processor, for input of the credit history data, and for output of the multi-tiered offer to apply for the credit instrument to an offeree which is communicated in an initial communication with the offeree, said multi-tiered offer disclosing said second plurality of interest rates corresponding to the plurality of credit risk scores, and the plurality of credit risk scores is not specific to the offeree.

2. The apparatus of claim 1, wherein the input/output apparatus is operatively connected to a second data processing apparatus for transmitting credit history data to the processor through the input/output apparatus.

3. The apparatus of claim 1, wherein the input/output apparatus is operatively connected to a generating device for generating the multi-tiered offer to the offeree.

4. A computer-readable medium encoded with computer readable program code, capable of being executed by a computer processor, to implement a method comprising:
   processing credit history data;
   determining a first plurality of interest rates based on said credit history data using a continuous function or algorithm, said first plurality of interest rates corresponding to a first plurality of credit risk scores derived at least in part from said credit history data; and
   determining a second plurality of interest rates based on said first plurality of interest rates using a second continuous function or algorithm and corresponding to a second plurality of credit risk scores derived at least in part from said credit history data, said second plurality of interest rates to be disclosed in an initial communication with an offeree comprising an initial offer to apply for a credit instrument wherein the second plurality of credit risk scores comprises a spectrum of credit risk scores that are not specific to the offeree.

* * * * *